US010867563B2

(12) United States Patent
Baek et al.

(10) Patent No.: US 10,867,563 B2
(45) Date of Patent: *Dec. 15, 2020

(54) DISPLAY DEVICE

(71) Applicant: LG ELECTRONICS INC., Seoul (KR)

(72) Inventors: Sangmin Baek, Seoul (KR); Hyongil Kil, Seoul (KR); Jaehyung Jeon, Seoul (KR); Juyoung Joung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/241,506

(22) Filed: Jan. 7, 2019

(65) Prior Publication Data

US 2019/0147805 A1 May 16, 2019

Related U.S. Application Data

(63) Continuation of application No. 15/078,530, filed on Mar. 23, 2016, now Pat. No. 10,210,814.

(30) Foreign Application Priority Data

Jan. 8, 2016 (KR) .................. 10-2016-0002467

(51) Int. Cl.
*G09G 3/34* (2006.01)
*G02F 1/1333* (2006.01)
*G02F 1/13357* (2006.01)

(52) U.S. Cl.
CPC ..... *G09G 3/3406* (2013.01); *G02F 1/133308* (2013.01); *G02F 1/133603* (2013.01);
(Continued)

(58) Field of Classification Search
None
See application file for complete search history.

(56) References Cited

U.S. PATENT DOCUMENTS 10,089,935 B2 * 10/2018 Baek .................. G02F 1/133603
10,210,814 B2 * 2/2019 Baek .................. G02F 1/133308
(Continued)

FOREIGN PATENT DOCUMENTS

KR 10-1447437 B1 10/2014
WO 2010/150883 A1 12/2010

*Primary Examiner* — Edward J Glick
*Assistant Examiner* — Anthony G Quash
(74) *Attorney, Agent, or Firm* — Birch, Stewart, Kolasch & Birch, LLP

(57) ABSTRACT

A display device includes a display panel; a frame at a rear of the display panel, the frame including a first and a second protrusions; a first substrate at a front surface of the frame, the first substrate elongated in a direction along a first side of the frame; a plurality of first light sources disposed on the first substrate at predetermined intervals in the direction. Further, the first protrusion is positioned at an end of the first substrate adjacent to the foremost light source in the first substrate, and the second protrusion is positioned at an end of the first substrate adjacent to the rearmost light source in the first substrate, at least one of the first and the second protrusions includes an inclined surface and the frame is pressed to form the first and the second protrusion such that the protrusions are formed on the front surface of the frame.

18 Claims, 32 Drawing Sheets

(52) U.S. Cl.
CPC ............ *G02F 1/133608* (2013.01); *G02F 2001/133314* (2013.01); *G02F 2001/133628* (2013.01); *G09G 2320/0233* (2013.01); *G09G 2320/04* (2013.01)

(56) References Cited

U.S. PATENT DOCUMENTS

| | | |
|---|---|---|
| 2007/0109788 A1 | 5/2007 | Pan |
| 2007/0253219 A1 | 11/2007 | Kim et al. |
| 2008/0316391 A1* | 12/2008 | Hsiao ............... G02F 1/133608 349/61 |
| 2011/0141403 A1 | 6/2011 | Kishimoto et al. |
| 2012/0092562 A1 | 4/2012 | Omiya et al. |
| 2014/0347864 A1 | 11/2014 | Kawada |
| 2015/0029710 A1 | 1/2015 | Kim et al. |
| 2016/0138779 A1* | 5/2016 | Oh .................... G02F 1/133605 362/97.1 |
| 2016/0223866 A1* | 8/2016 | Lee ................... G02F 1/133603 |

\* cited by examiner

DISPLAY DEVICE

CROSS-REFERENCE TO RELATED APPLICATIONS

This Application is a Continuation of co-pending U.S. patent application Ser. No. 15/078,530 filed on Mar. 23, 2016, which claims the priority benefit under 35 U.S.C. § 119(a) to Korean Patent Application No. 10-2016-0002467 filed in the Republic of Korea on Jan. 8, 2016, all of which are hereby expressly incorporated by reference into the present application.

BACKGROUND OF THE INVENTION

Field of the Invention

The present disclosure relates to a display device.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

Accordingly, an object of the present disclosure is to address the above-described and other problems.

Another aspect of the present disclosure is to provide an effective heat dissipation structure of a backlight unit.

Another aspect of the present disclosure is to provide an effective contact structure between a backlight unit and a frame.

Another aspect of the present disclosure is to provide a heat dissipation structure of a backlight unit reducing the manufacturing cost.

Another aspect of the present disclosure is to provide a backlight unit having improved durability or quality.

Another aspect of the present disclosure is to provide a display device improving assembly convenience.

Another aspect of the present disclosure is to provide a display device improving heat dissipation.

In one aspect, there is provided a display device comprising a display panel, a frame positioned in the rear of the display panel, a backlight unit positioned between the display panel and the frame and providing light for the display panel, and a heat dissipation protrusion formed on the frame and contacted with the backlight unit.

According to another aspect of the present disclosure, the backlight unit may include a substrate and a light source mounted on the substrate. The heat dissipation protrusion may contact the substrate positioned under the light source.

According to another aspect of the present disclosure, the backlight unit may include a plurality of light sources. The plurality of light sources may be sequentially positioned along a left-right direction or an up-down direction of the display panel and may be mounted on the substrate between the plurality of light sources and the frame. The heat dissipation protrusion may be a plurality of heat dissipation protrusions. The plurality of heat dissipation protrusions may be formed on the frame at a location corresponding to the plurality of light sources and may contact the substrate.

According to another aspect of the present disclosure, the display device may further comprise a coupling protrusion positioned adjacent to the heat dissipation protrusion while being separated from the heat dissipation protrusion and protruding from the frame. The substrate may have a coupling groove, into which the coupling protrusion is inserted.

According to another aspect of the present disclosure, the display device may further comprise an inclined protrusion positioned adjacent to one end of the substrate and positioned between the substrate and the frame. The inclined protrusion may provide an inclined surface facing toward the heat dissipation protrusion.

According to another aspect of the present disclosure, the display device may further comprise an inclined protrusion formed on the frame and positioned between the frame and the substrate and a coupling protrusion formed on the frame and inserted into the substrate. The heat dissipation protrusion may be positioned between the inclined protrusion and the coupling protrusion.

According to another aspect of the present disclosure, a height of the inclined protrusion may be greater than a height of the heat dissipation protrusion.

According to another aspect of the present disclosure, the display device may further comprise at least two inclined protrusions positioned on left and right sides or upper and lower sides of a front surface of the frame. The heat dissipation protrusion may be a plurality of heat dissipation protrusions. The plurality of heat dissipation protrusions may be sequentially disposed between the at least two inclined protrusions.

According to another aspect of the present disclosure, the display device may further comprise at least one coupling protrusion positioned between the plurality of heat dissipation protrusions. The coupling protrusion may fix the backlight unit.

According to another aspect of the present disclosure, the frame and the heat dissipation protrusion may include a metal material.

An effect of the display device according to the present disclosure is described below.

According to at least one aspect of the present disclosure, the present disclosure can provide an effective heat dissipation structure of the backlight unit.

According to at least one aspect of the present disclosure, the present disclosure can provide an effective contact structure between the backlight unit and the frame.

According to at least one aspect of the present disclosure, the present disclosure can reduce the manufacturing cost of the backlight unit.

According to at least one aspect of the present disclosure, the present disclosure can improve durability or quality of the backlight unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
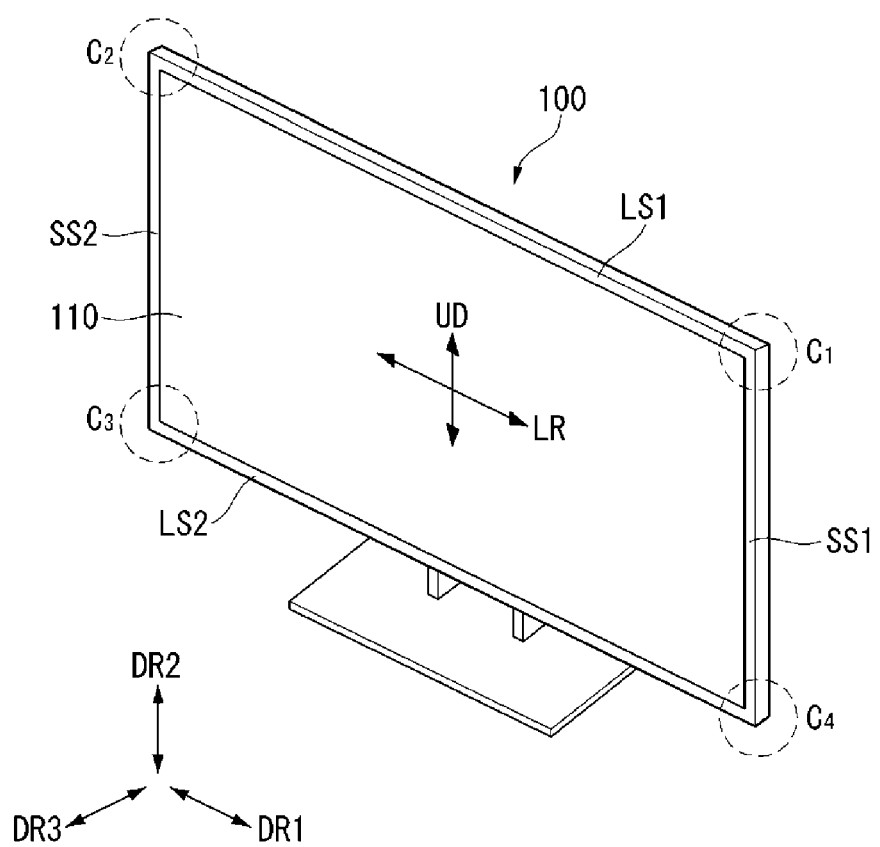
FIGS. 1 and 2 illustrate a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction. Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
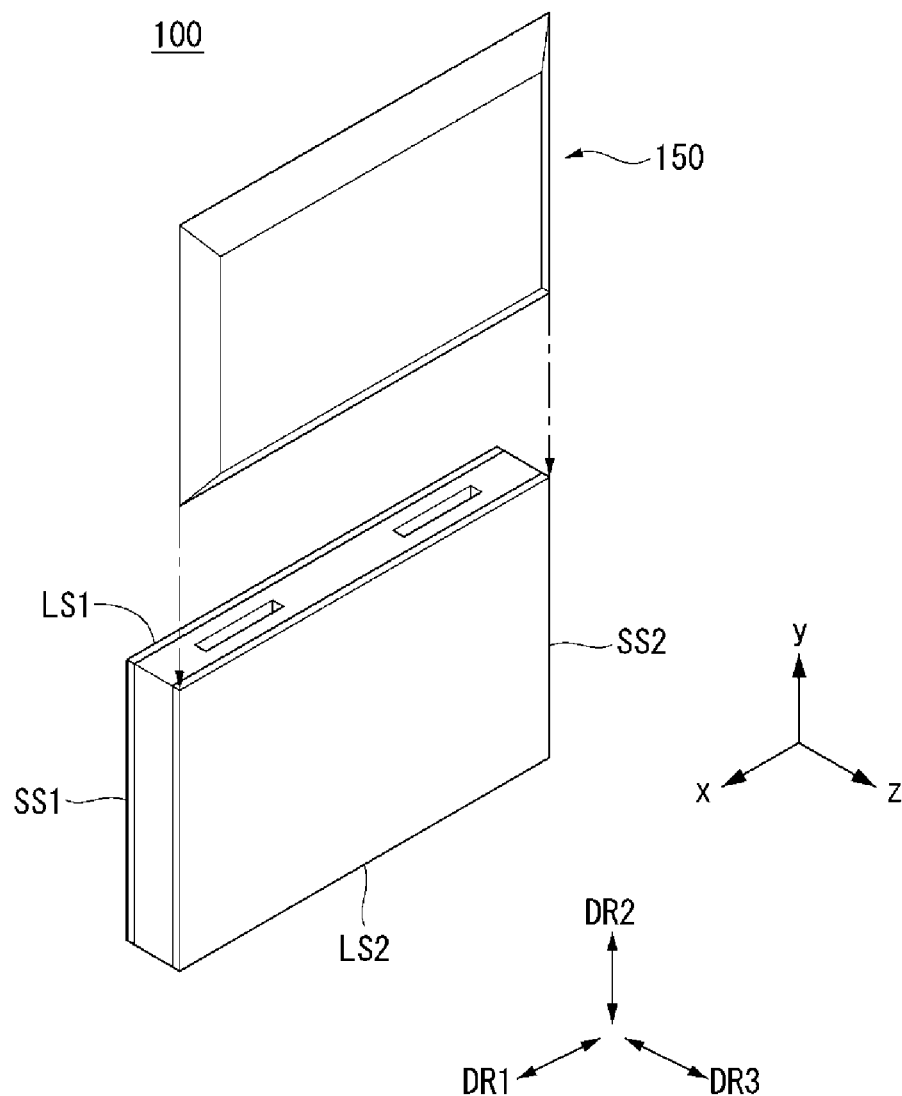

FIGS. 1 and 2 illustrate a display device according to an example embodiment of the invention.

The display device 100 according to the embodiment of the invention may include a display panel 110 and a back cover 150 positioned in the rear of the display panel 110.

The back cover 150 may be coupled with the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 which is adjacent to the first and second short sides SS1 and SS2 and is positioned between the first short side SS1 and the second short side SS2, of the display panel 110 in the sliding manner.

The back cover 150 and/or other components adjacent to the back cover 150 may include a protrusion, a sliding portion, a connection portion, etc., so that the back cover 150 is connected to the display panel 110 in the sliding manner.

FIGS. 3 to 10 illustrate configuration of a display device related to the embodiment of the invention.

Figure 3:
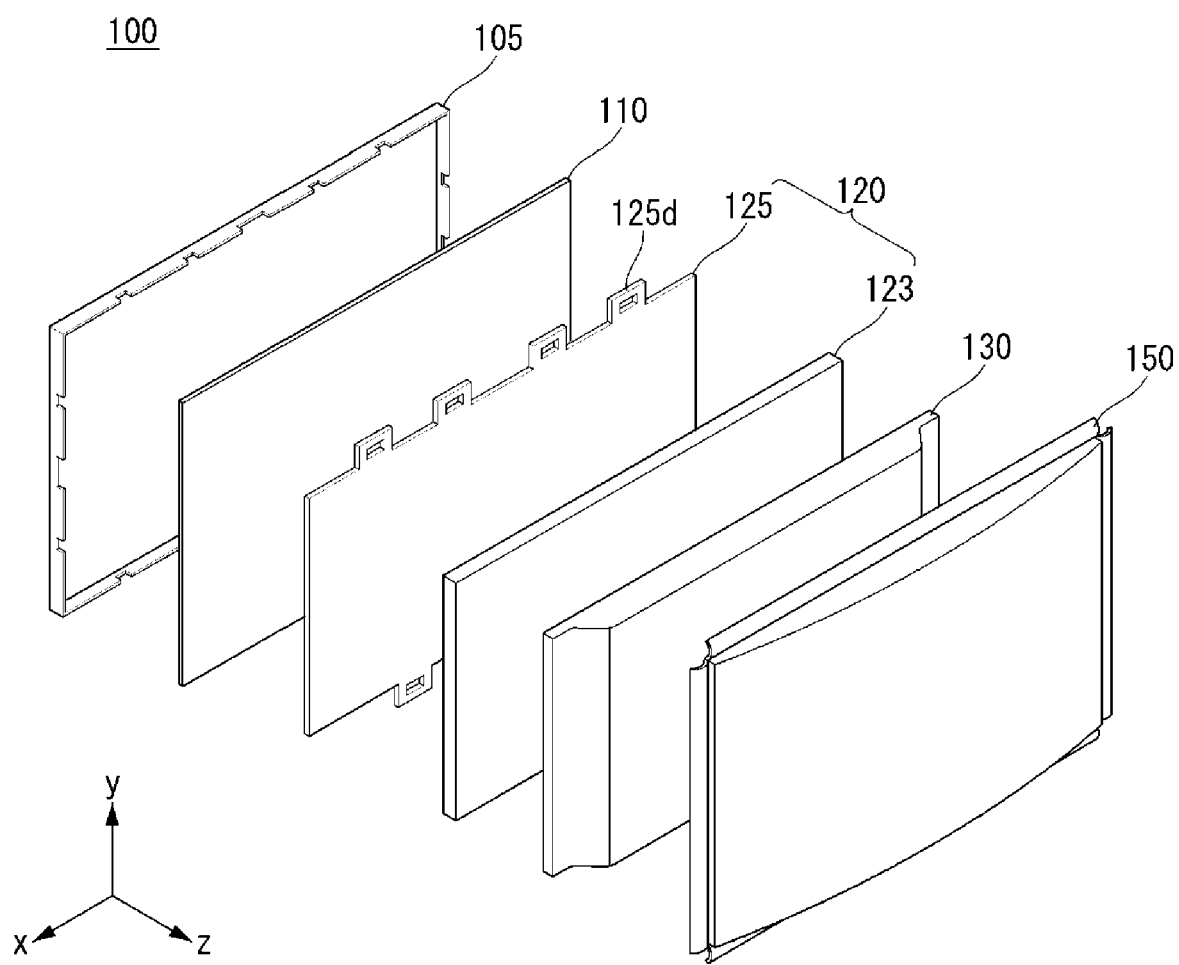
FIGS. 3 to 10 illustrate configuration of a display device related to an example embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular frame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover positioned at the side surface of the display panel 110. The front cover and the side cover may be separately configured. One of the front cover and the side cover may be omitted. For example, the front cover may be omitted, and only the side cover may be absent in terms of an attractive appearance of the display device 100.

The display panel 110 may be positioned at a front surface of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed therebetween.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In the instance of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or the back cover 150. Namely, the coupling portion 125d may be directly coupled to the front cover 105 and/or the back cover 150. Alternatively, the coupling portion 125d may be coupled to a structure formed on the front cover 105 and/or the back cover 150. Namely, the coupling portion 125d may be indirectly coupled to the front cover 105 and/or the back cover 150.

The optical layer 123 may include the light source, etc. The detailed configuration of the optical layer 123 is described in the corresponding paragraphs.

The frame 130 may function to support the components of the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
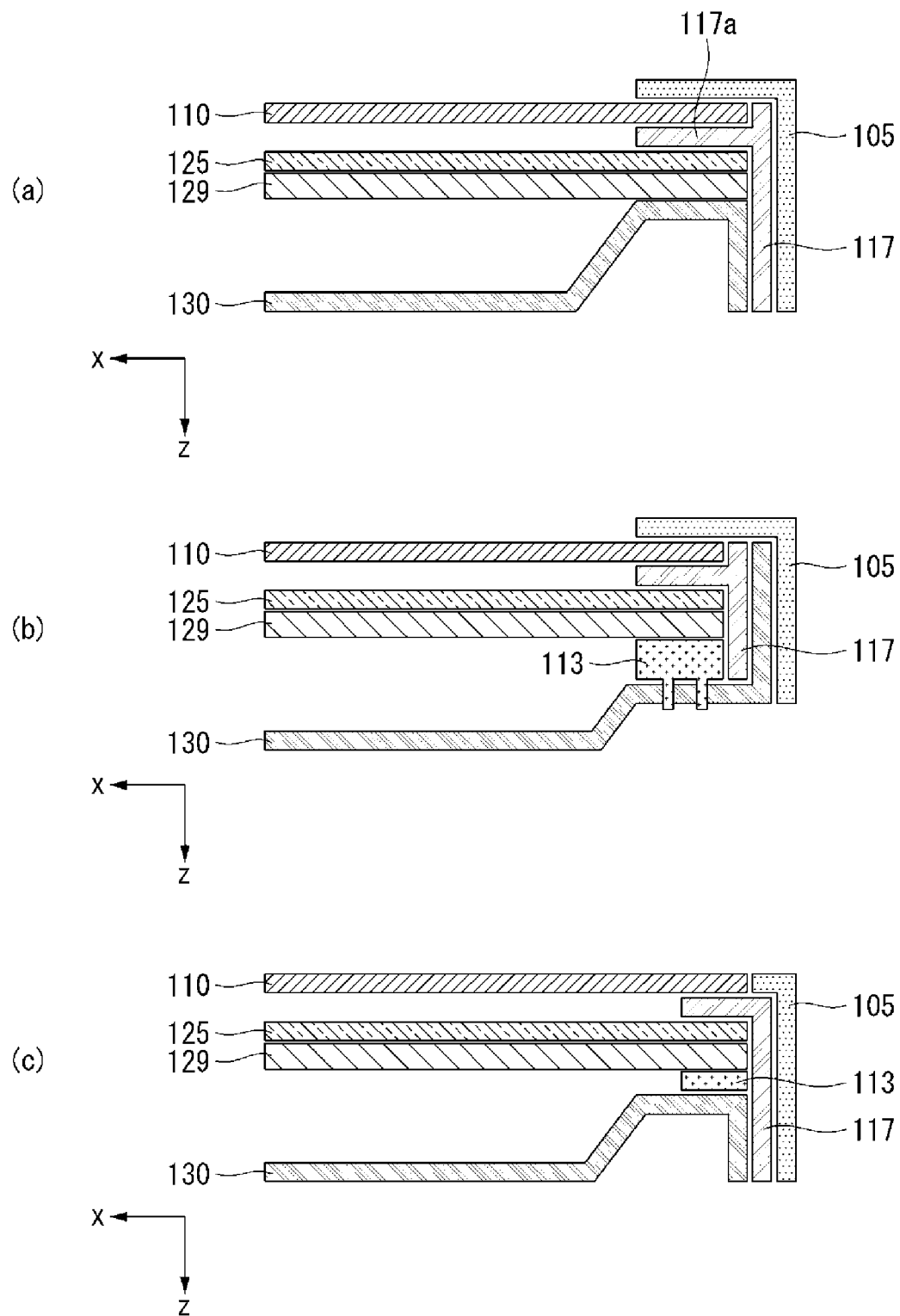

As shown in (a) of FIG. 4, the optical sheet 125 and/or a diffusion plate 129 may be positioned on the frame 130. The optical sheet 125 and/or the diffusion plate 129 may be coupled with the frame 130 at an edge of the frame 130. The optical sheet 125 and/or the diffusion plate 129 may be directly placed at the edge of the frame 130. Namely, an outer perimeter of the optical sheet 125 and/or an outer perimeter of the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled with the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled with the second guide panel 113. Namely, the second guide panel 113 may have a shape, in which the second guide panel 113 is coupled with the frame 130 and the optical sheet 125 and/or the diffusion plate 129 is coupled with the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
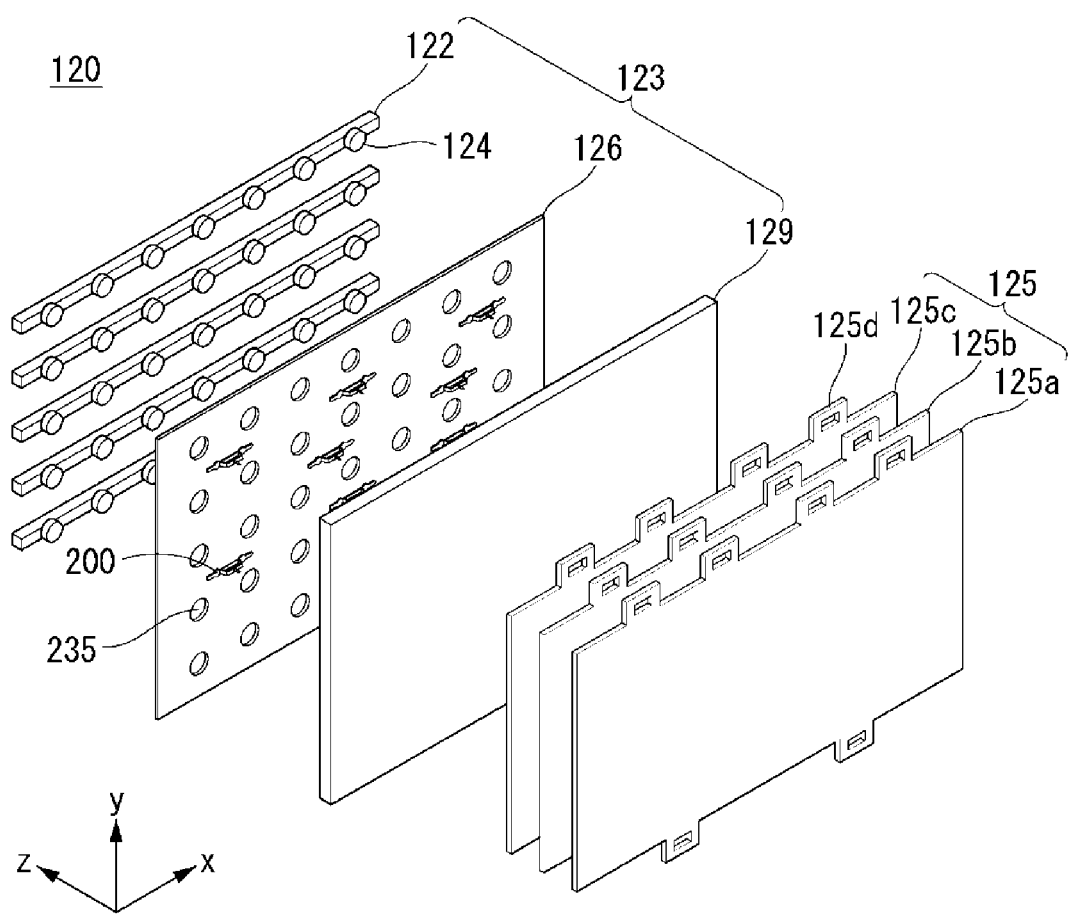
Figure 6:
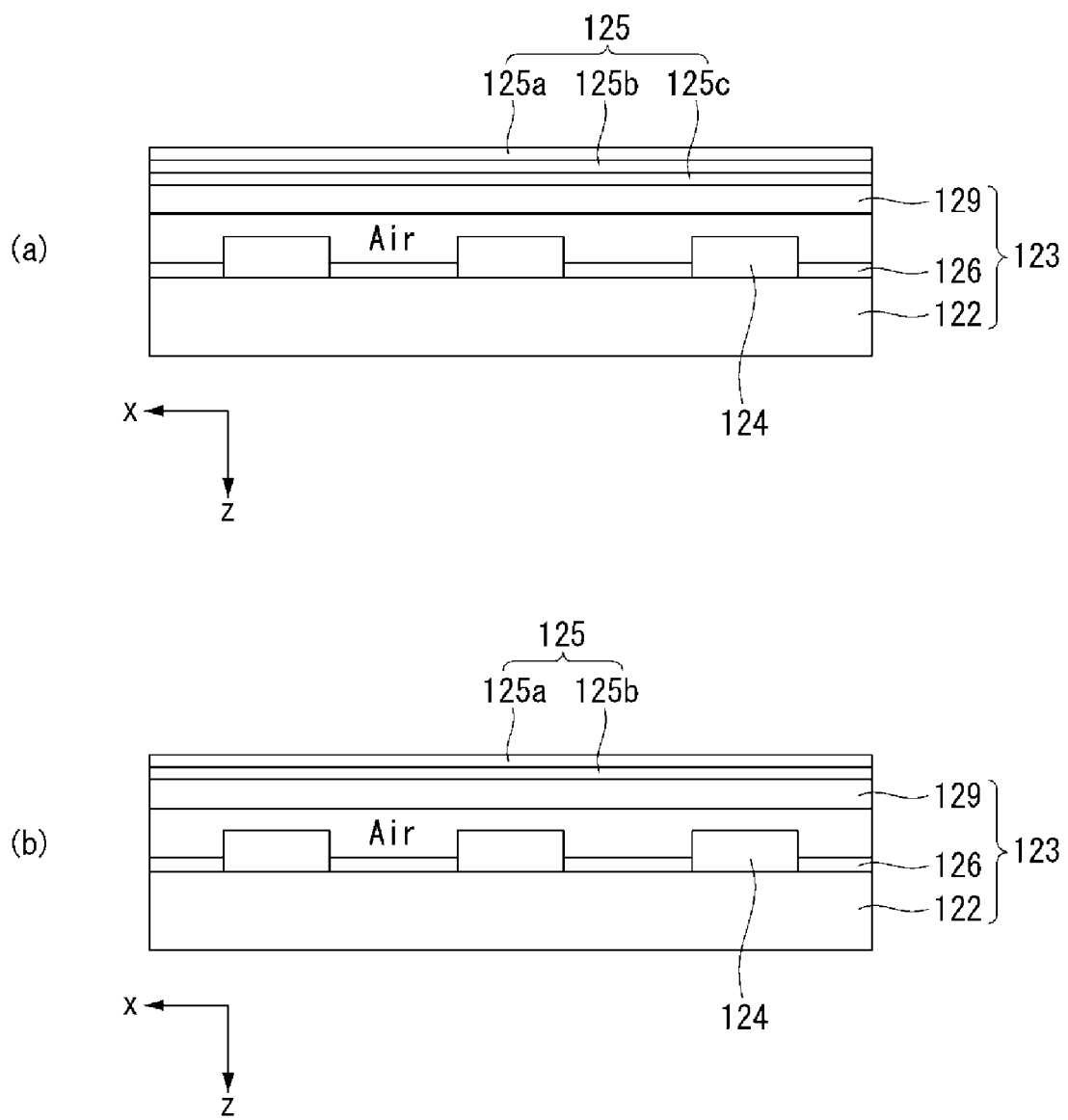

Referring to FIGS. 5 and 6, the backlight unit 120 may include a substrate 122, at least one light assembly 124, the optical layer 123 including a reflecting sheet 126 and the diffusion plate 129, and the optical sheet 125 positioned on a front surface of the optical layer 123.

The substrate 122 may be configured as a plurality of straps, which extend in the first direction and are separated from one another by a predetermined distance in the second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be a light emitting diode (LED) chip or a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (Chip-On-Board) type. The COB light source may have a configuration, in which the LED chip as the light source is directly coupled with the substrate 122. Thus, the process may be simplified. Further, a resistance may be reduced, and a loss of energy resulting from heat may be reduced. Namely, power efficiency of the light assembly 124 may increase. The COB light source can provide the brighter lighting and may be implemented to be thinner and lighter than a related art.

The reflecting sheet 126 may be positioned at the front surface of the substrate 122. The reflecting sheet 126 may be positioned in an area excluding a formation area of the light assemblies 124 of the substrate 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide which are a reflection material. The reflecting sheet 126 may include metal and/or metal oxide having a high reflectance, for example, aluminum (Al), silver (Ag), gold (Au), and titanium dioxide (TiO2).

The reflecting sheet 126 may be formed by depositing and/or coating the metal or the metal oxide on the substrate 122. An ink including the metal material may be printed on the reflecting sheet 126. A deposition layer may be formed on the reflecting sheet 126 using a heat deposition method, an evaporation method, or a vacuum deposition method such as a sputtering method. A coating layer and/or a printing layer may be formed on the reflecting sheet 126 using a printing method, a gravure coating method or a silk screen method.

An air gap may be positioned between the reflecting sheet 126 and the diffusion plate 129. The air gap may serve as a buffer capable of widely diffusing light emitted from the light assembly 124. A supporter 200 may be positioned between the reflecting sheet 126 and the diffusion plate 129, so as to keep the air gap.

A resin may be deposited on the light assembly 124 and/or the reflecting sheet 126. The resin may function to diffuse light emitted from the light assembly 124. The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may further homogenize a diffusion of the light. The prism sheet may concentrate light coming from the diffusion sheet and may make the concentrated light be vertically incident on the display panel 110.

The coupling portion 125d may be formed on at least one of corners of the optical sheet 125. The coupling portion 125d may be formed in at least one of the first to third optical sheets 125a to 125c.

The coupling portion 125d may be formed at an edge of the long side of the optical sheet 125. The coupling portion 125d formed on the first long side and the coupling portion 125d formed on the second long side may be asymmetric. For example, a number and/or a position of the coupling portions 125d formed on the first long side may be different from a number and/or a position of the coupling portions 125d formed on the second long side.

Figure 7A:
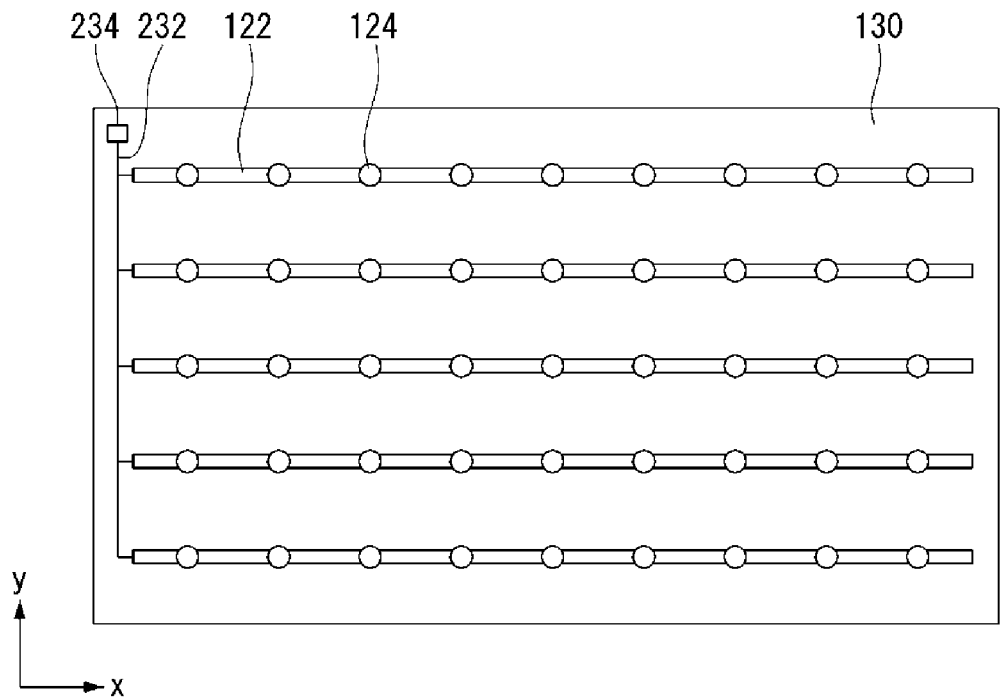

Referring to FIG. 7A, the substrate 122 configured as the plurality of straps, which extend in the first direction and are separated from one another by a predetermined distance in the second direction perpendicular to the first direction, may be provided on the frame 130. One end of each of the plurality of straps (i.e., the plurality of substrates 122) may be connected to a wire electrode 232.

The wire electrode 232 may extend in the second direction. The wire electrode 232 may be connected to the ends of the substrates 122 at predetermined intervals in the second direction.

A wire hole 234 may be formed at one end of the wire electrode 232. The wire hole 234 may be a fine hole, through which the wire electrode 232 passes. The wire electrode 232 may extend to a back surface of the frame 130 through the wire hole 234. The wire electrode 232 may be electrically connected to an adaptor (not shown) positioned at the back surface of the frame 130 through the wire hole 234.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 7B:
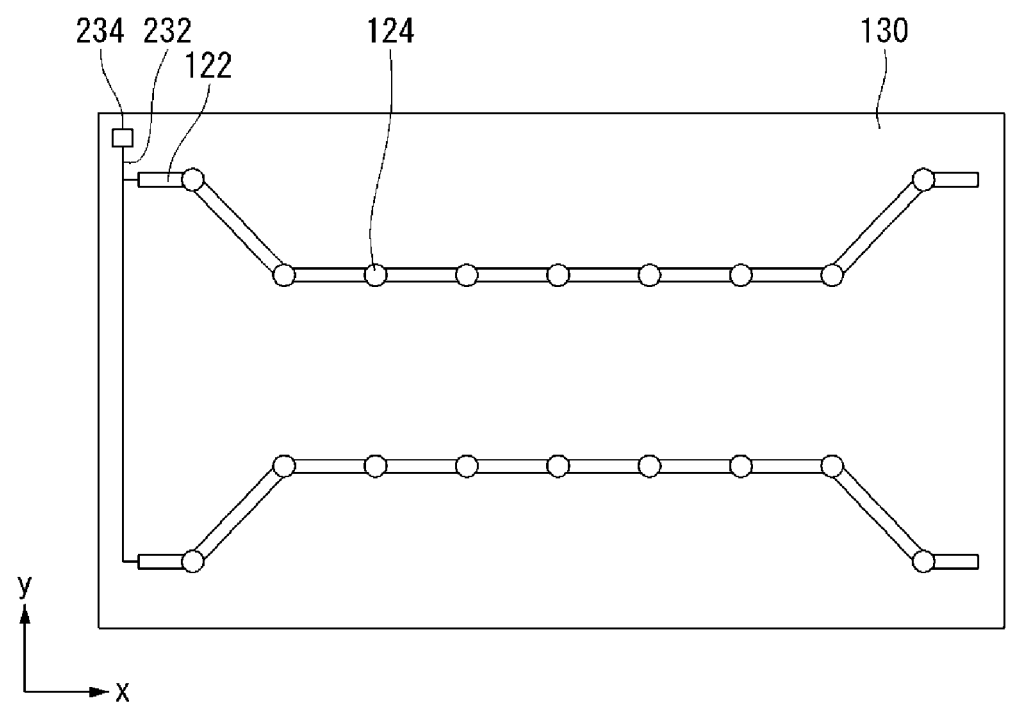

Referring to FIG. 7B, both ends of the substrate 122 configured as the plurality of straps may extend in not the first direction but another direction. Namely, both ends of the substrate 122 may extend to an edge area of the frame 130, so that the light assembly 124 is positioned in the edge area.

A dark portion of the edge area of the frame 130 can be compensated by disposing the substrate 122, on which the light assemblies 124 are mounted, in the edge area of the frame 130. Namely, the entire area of the display device can uniformly emit light.

One end of the substrate 122 positioned in the edge area may be connected to the wire electrode 232. The wire electrode 232 may extend in the second direction and may be electrically connected to the adaptor positioned at the back surface of the frame 130 through the wire hole 234 formed at one end of the wire electrode 232.

Figure 7C:
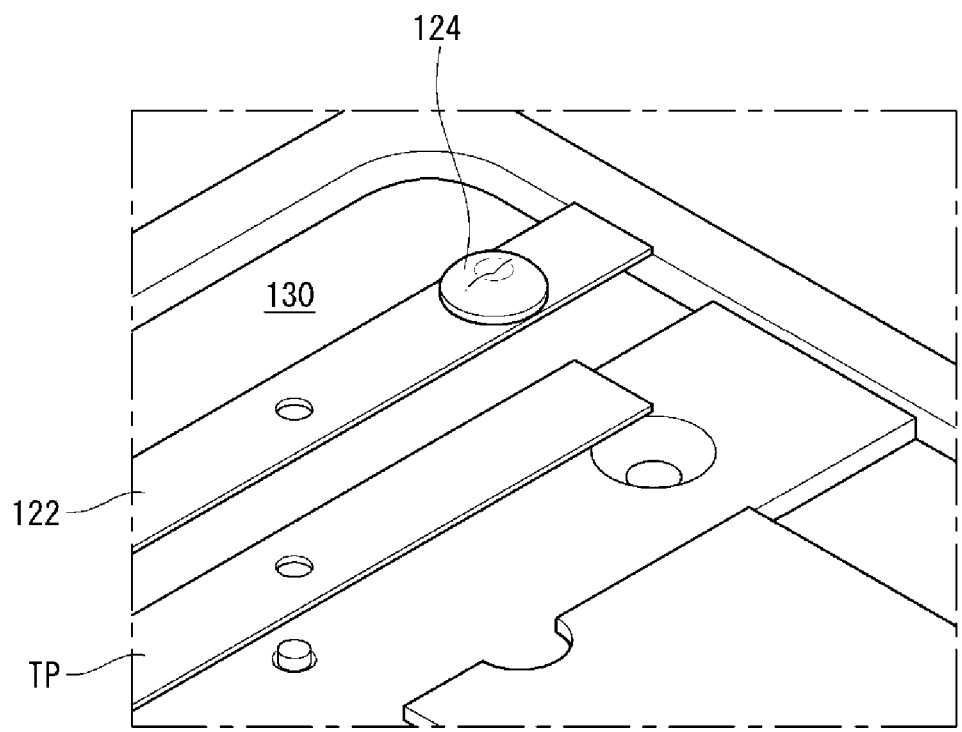

Referring to FIG. 7C, the substrate 122 may be coupled with the front surface of the frame 130. The light assemblies 124 may be mounted on the substrate 122. An adhesive member TP may be positioned between the substrate 122 and the front surface of the frame 130. The adhesive member TP may be fixed to the front surface of the frame 130, and the substrate 122 may be fixed to the adhesive member TP. For example, the adhesive member TP may be a double-sided tape. In this instance, the front surface of the frame 130 may not be flat. The frame 130 may be pressed, so that the components of the display device 100 are safely placed or necessary rigidity is provided for the display device 100. Hence, the front surface of the frame 130 may not be flat. Because the front surface of the frame 130 is not flat, the substrate 122 fixed to the adhesive member TP may be detached or separated from the adhesive member TP. As a result, heat generated in the light assemblies 124 may not be smoothly dissipated. Namely, heat generated in the light assemblies 124 may be transferred to the frame 130 through the substrate 122 and may be dissipated. However, when a contact area between the substrate 122 and the frame 130 decreases or the substrate 122 is separated from the frame 130, the dissipation of heat generated in the light assemblies 124 may be a problem.

Figure 8:
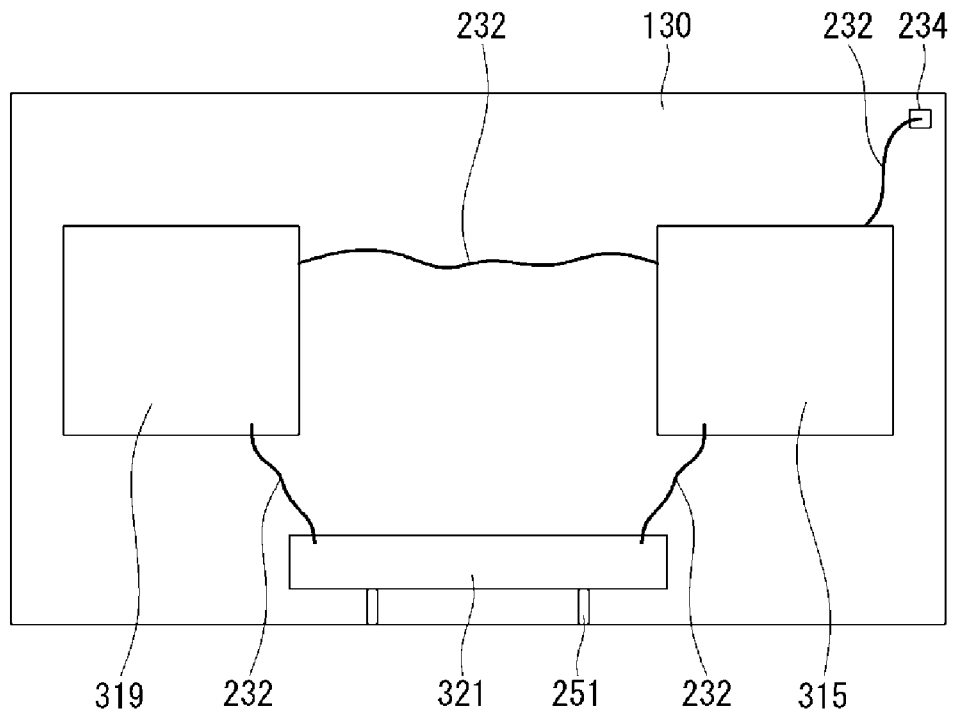

Referring to FIG. 8, the wire electrode 232 extending from the front surface of the frame 130 through the wire hole 234 may be connected to one side of a power supply board 315. The power supply board 315 may be a printed circuit board supplying electric power to the display device 100. The power supply board 315 may convert an AC frequency into a DC frequency.

The power supply board 315 may cause the light assemblies 124 positioned on the front surface of the frame 130 to emit light through the wire electrode 232. Other side of the power supply board 315 may be connected to a main board 321 through the wire electrode 232. The main board 321 may be separated from the power supply board 315 by a predetermined distance. For example, the main board 321 may be positioned opposite the power supply board 315 in the second direction with respect to the middle of the frame 130.

The main board 321 may be a printed circuit board providing an interface for operating the display device 100. Further, the main board 321 may check and control an operation state of the components of the display device 100.

The power supply board 315 and the main board 321 may be connected to a timing controller board 319 through the wire electrode 232. The timing controller board 319 may be a printed circuit board transmitting electric power or signals received from the power supply board 315 or the main board 321 to the display panel 110. The timing controller board 319 may be electrically connected to the display panel 110 positioned at the front surface of the frame 130 through flat flexible cables 251.

FIG. 8 shows that the printed circuit boards are connected to one another, as an example. Other configurations may be used. For example, only at least a portion of each printed circuit board may be connected to one another.

Figure 9:
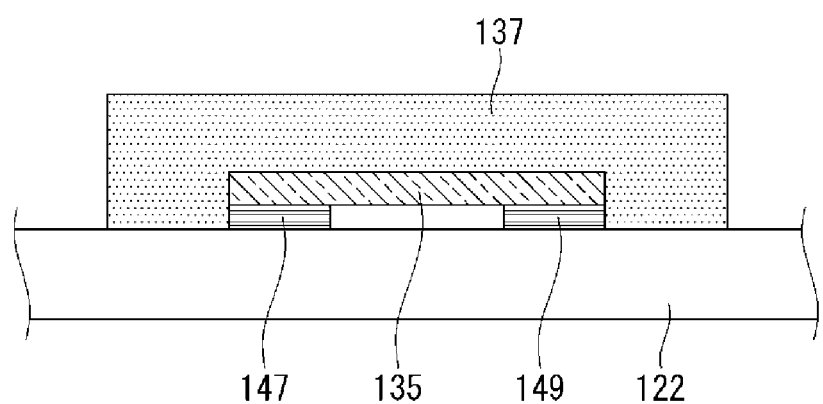
Figure 10:
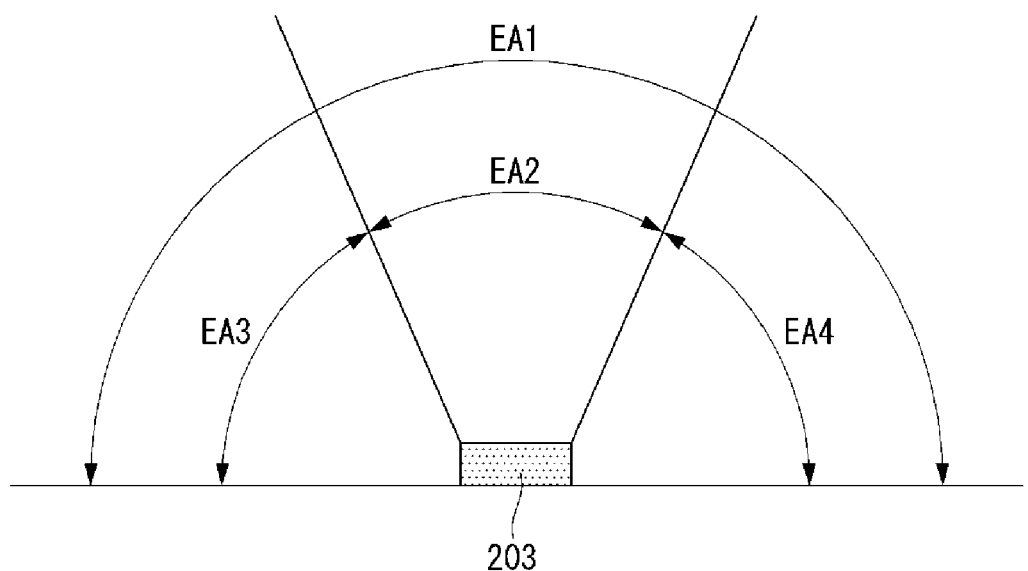

FIGS. 9 and 10 show a light source according to the embodiment of the invention.

As shown in FIG. 9, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthyl)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light source 203 is possible by forming the light source 203 on the substrate 122, the light source 203 may be driven at a high current. Hence, a number of light sources 203 required to obtain the same amount of light may further decrease.

Further, because the light source 203 is mounted on the substrate 122, a wire bonding process may not be necessary. Hence, the manufacturing cost may be reduced due to the simplification of the manufacturing process.

As shown in FIG. 10, the light source 203 according to the embodiment of the invention may emit light in a first emission range EA1. Namely, the light source 203 may emit light in the first emission range EA1 including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may emit light in a wide emission range including the side.

FIGS. 11 to 39 illustrate examples of a frame and a backlight unit according to the embodiment of the invention.

Figure 11:
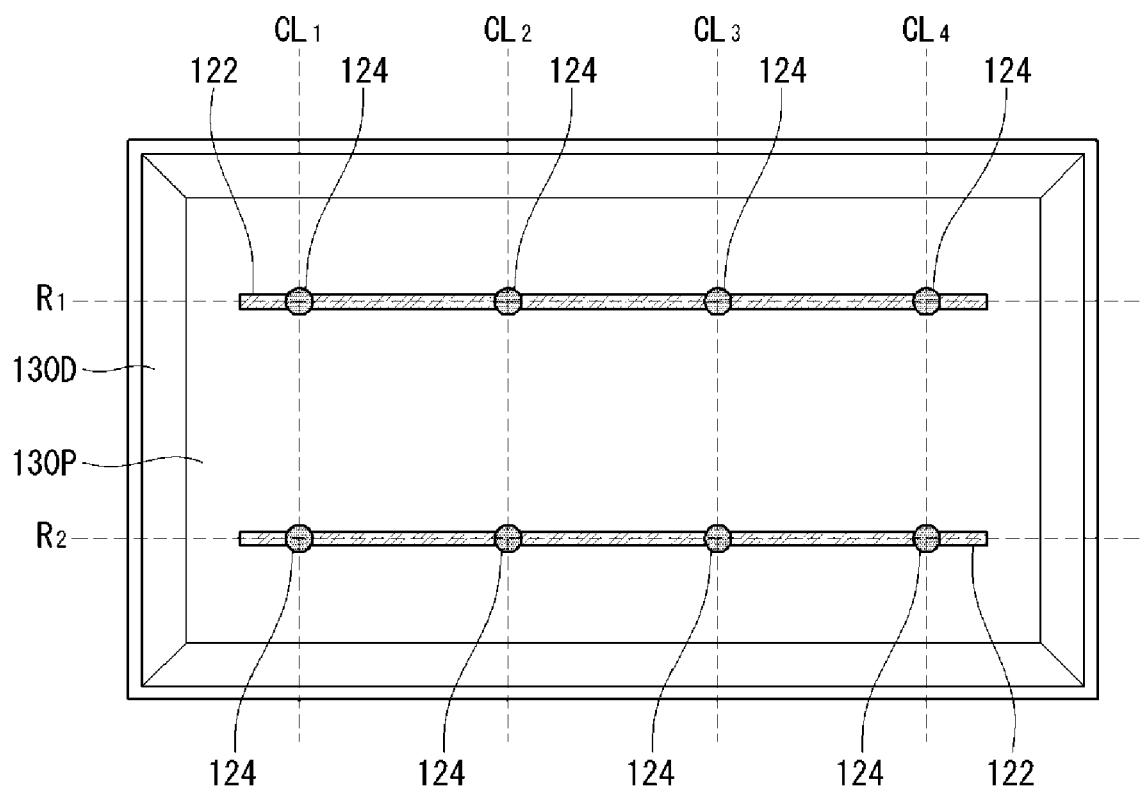
FIGS. 11 to 39 illustrate examples of a frame and a backlight unit according to an example embodiment of the invention.

Referring to FIG. 11, the frame 130 may be flat. The frame 130 may have a flat portion 130P. The flat portion 130P may form a plane of the frame 130. The frame 130 may have an inclined portion 130D. The inclined portion 130D may form a perimeter of the frame 130. The inclined portion 130D may be positioned at an edge of the flat portion 130P. The inclined portion 130D may be positioned at one surface of the flat portion 130P. The inclined portion 130D may be positioned at all of four surfaces of the flat portion 130P. The frame 130 may entirely have a bowl shape formed by the flat portion 130P and the inclined portion 130D.

The substrate 122 may be installed on the frame 130. The substrate 122 may elongate in the left-right direction of the frame 130. The substrate 122 may be disposed on an upper part of the frame 130. The substrate 122 may be disposed on a lower part of the frame 130. The plurality of substrates 122 may be installed on the frame 130. The plurality of substrates 122 may be sequentially arranged from the upper part to the lower part of the frame 130. Namely, the plurality of substrates 122 may elongate in the left-right direction of the frame 130 and may be arranged in the up-down direction of the frame 130.

The light assembly 124 may be mounted on the substrate 122. The plurality of light assemblies 124 may be mounted on the substrate 122. The plurality of light assemblies 124 may be sequentially arranged along a longitudinal direction of the substrate 122. Namely, the plurality of light assemblies 124 may be entirely evenly arranged on the flat portion 130P of the frame 103.

Figure 12:
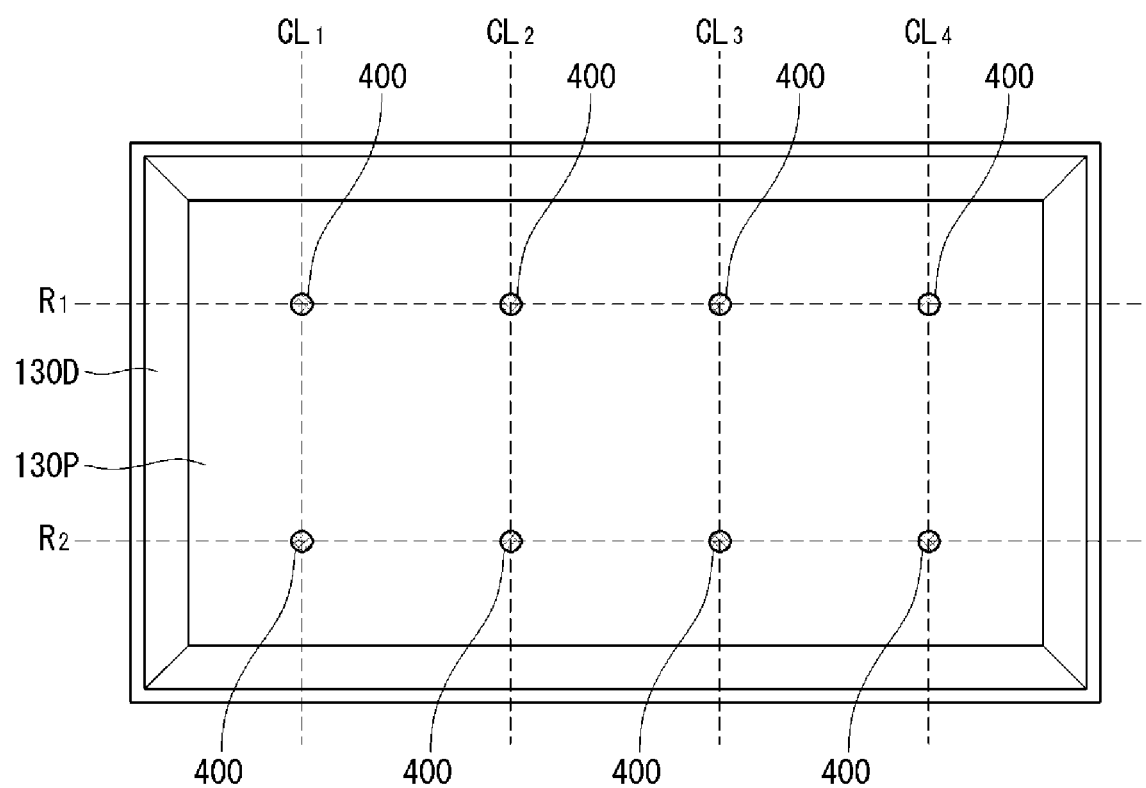

Referring to FIG. 12, a heat dissipation protuberance (or a heat dissipation protrusion) 400 may be positioned on the frame 130. The heat dissipation protuberance 400 may be positioned on the flat portion 130P of the frame 103. The heat dissipation protuberance 400 may be a plurality of heat dissipation protuberances. The plurality of heat dissipation protuberances 400 may be disposed on one surface of the flat portion 130P in the left-right direction or the up-down direction. In another point of view, the heat dissipation protuberances 400 may correspond to the arrangement of the light assemblies 124. Namely, the heat dissipation protuberance 400 may be positioned under the light assembly 124. The heat dissipation protuberance 400 may be referred to as a first protuberance.

For example, referring to FIGS. 11 and 12, the light assemblies 124 may be arranged on the flat portion 130P of the frame 130 in two rows of the left-right direction and four columns of the up-down direction. The heat dissipation protuberances 400 may be arranged on the flat portion 130P of the frame 130 in two rows of the left-right direction and four columns of the up-down direction. Namely, a total of eight light assemblies 124 may be arranged on the flat portion 130P of the frame 130, and also a total of eight heat dissipation protuberances 400 may be arranged on the flat portion 130P of the frame 130.

Figure 13:
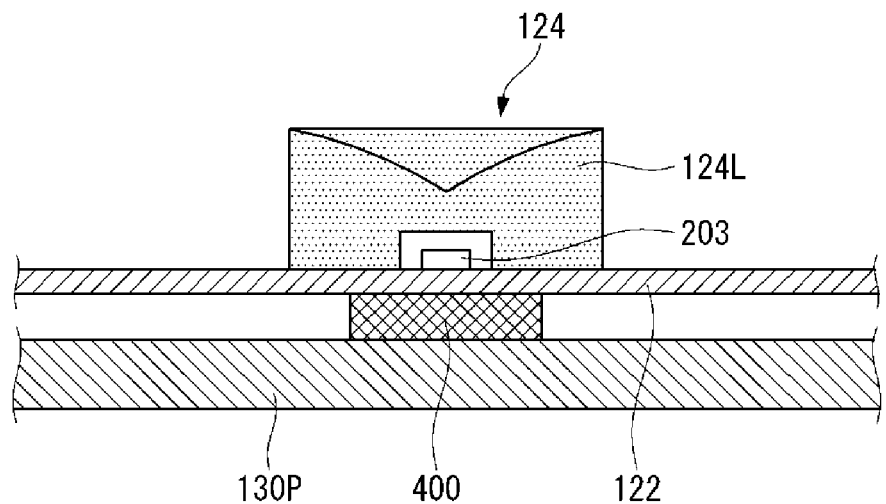
Figure 14:
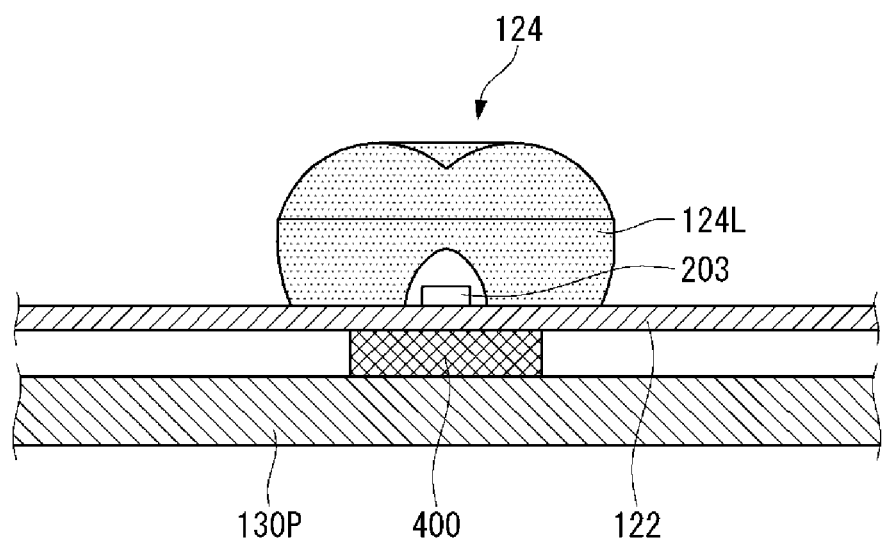

Referring to FIGS. 13 and 14, the light assembly 124 may be mounted on the substrate 122. The light assembly 124 may include a light source 203 and a lens 124L. The light source 203 may be, for example, a LED. The lens 124L may evenly disperse light emitted from the light source 203.

The substrate 122 may be disposed on the flat portion 130P of the frame 130. The heat dissipation protuberance 400 may be positioned between the substrate 122 and the flat portion 130P of the frame 130. The heat dissipation protuberance 400 may be positioned between the light assembly 124 and the flat portion 130P of the frame 130. The frame 130 may be formed of a metal material. The heat dissipation protuberance 400 may be formed of a metal material. The heat dissipation protuberance 400 and the frame 130 may be formed as one body. Alternatively, the heat dissipation protuberance 400 and the frame 130 may be separately formed and may be coupled with each other.

For example, the frame 130 may include steel or aluminum. Further, the heat dissipation protuberance 400 may include steel or aluminum. As another example, the heat dissipation protuberance 400 may include copper. Hence, the heat dissipation protuberance 400 may efficiently transfer heat generated in the light assembly 124 to the outside.

Figure 15A:
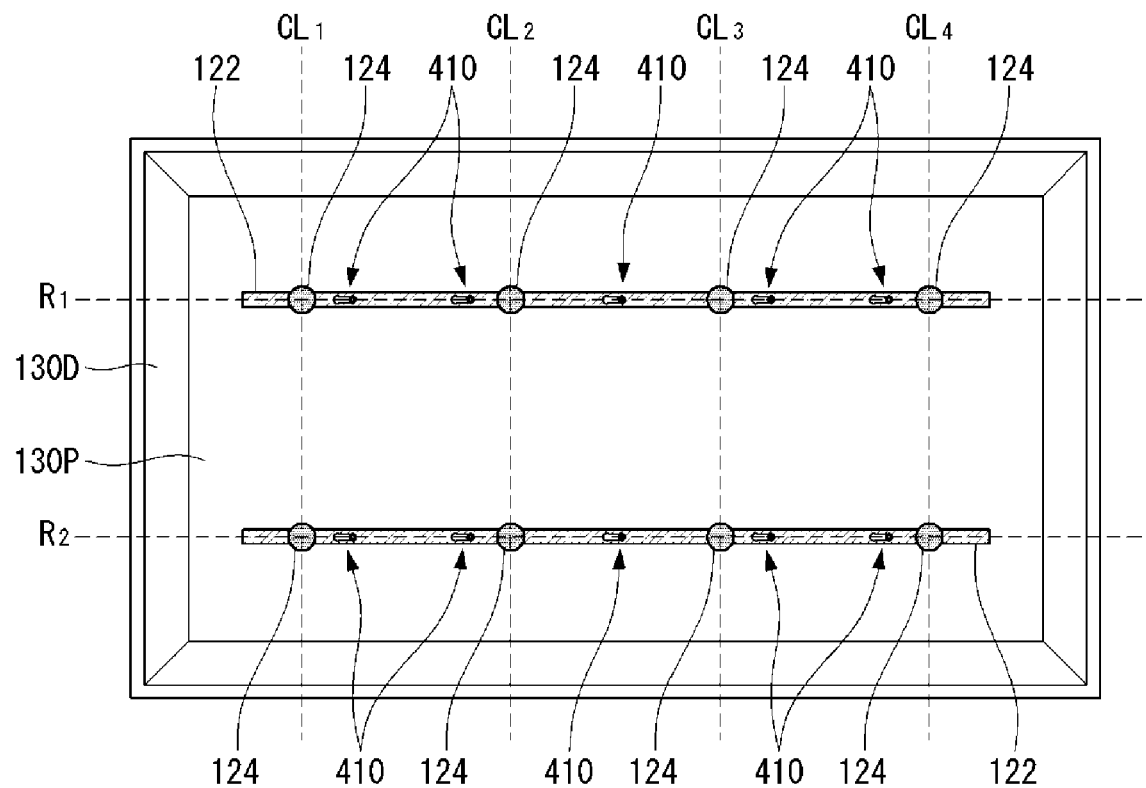

Referring to FIG. 15A, a coupling protuberance (or a coupling protrusion) 410 may be formed on the frame 130. The coupling protuberance 410 may protrude from the flat portion 130P of the frame 130. The coupling protuberance 410 may be a plurality of coupling protuberances. The plurality of coupling protuberances 410 may be formed along the substrate 122. Namely, the plurality of coupling protuberances 410 may be sequentially formed on the flat portion 130P of the frame 130 along the longitudinal direction of the substrate 122. In another point of view, the plurality of coupling protuberances 410 may be disposed between the plurality of light assemblies 124. The coupling protuberance 410 may be referred to as a third protuberance.

Figure 15B:
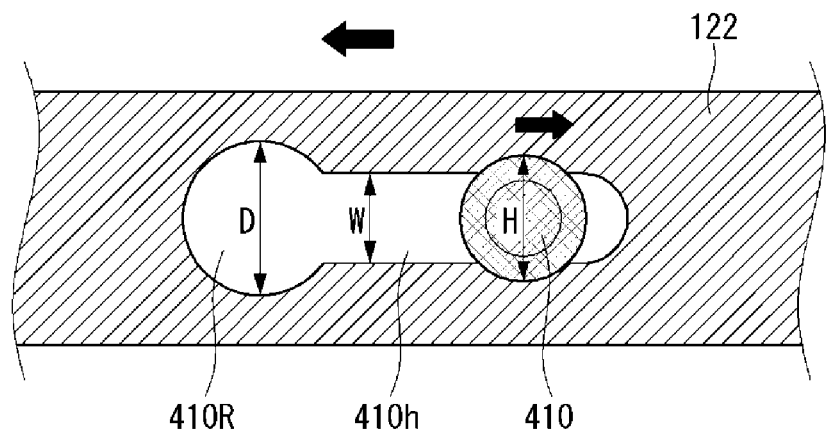

Referring to FIG. 15B, a coupling groove 410h may be formed on the substrate 122. The coupling groove 410h may elongate on the substrate 122. The coupling groove 410h may elongate along the longitudinal direction of the substrate 122. The coupling groove 410h may have a circular insertion groove 410R at one end. The coupling protuberance 410 may have a head H smaller than a diameter D of the insertion groove 410R. The head H of the coupling protuberance 410 may be larger than a width W of the coupling groove 410h. Hence, the coupling protuberance 410 may be inserted into the insertion groove 410R and may couple the substrate 122 with the frame 130 while sliding along the coupling groove 410h.

Figure 16:
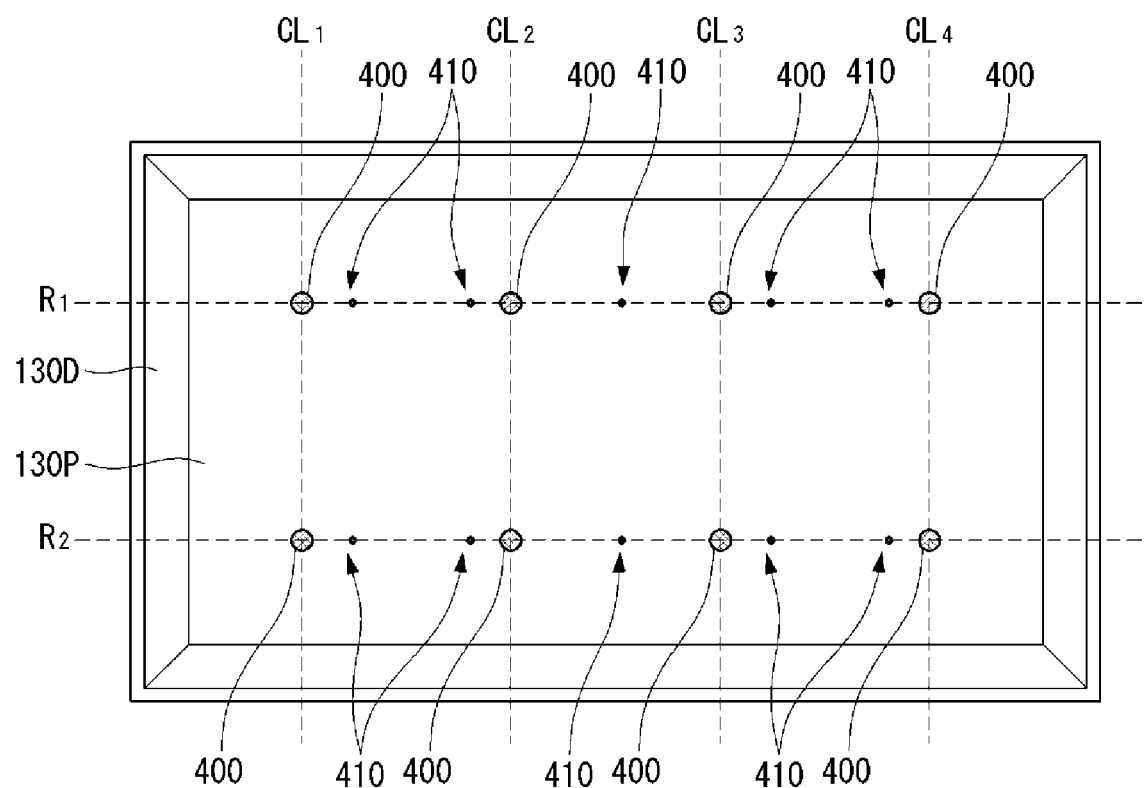

Referring to FIG. 16, the plurality of coupling protuberances 410 may be disposed between the plurality of heat dissipation protuberances 400. For example, in a first row R1, the two coupling protuberances 410 between a first column CL1 and a second column CL2 may be formed on the frame 130; the one coupling protuberance 410 between the second column CL2 and a third column CL3 may be formed on the frame 130; and the two coupling protuberances 410 between the third column CL3 and a fourth column CL4 may be formed on the frame 130. Further, in a second row R2, the two coupling protuberances 410 between the first column CL1 and the second column CL2 may be formed on the frame 130; the one coupling protuberance 410 between the second column CL2 and the third column CL3 may be formed on the frame 130; and the two coupling protuberances 410 between the third column CL3 and the fourth column CL4 may be formed on the frame 130.

Figure 17:
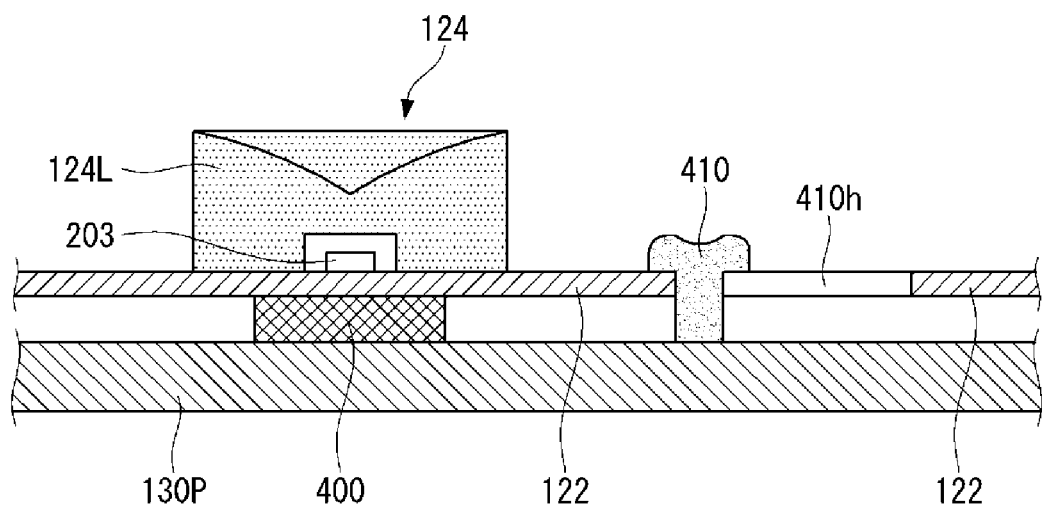
Figure 18:
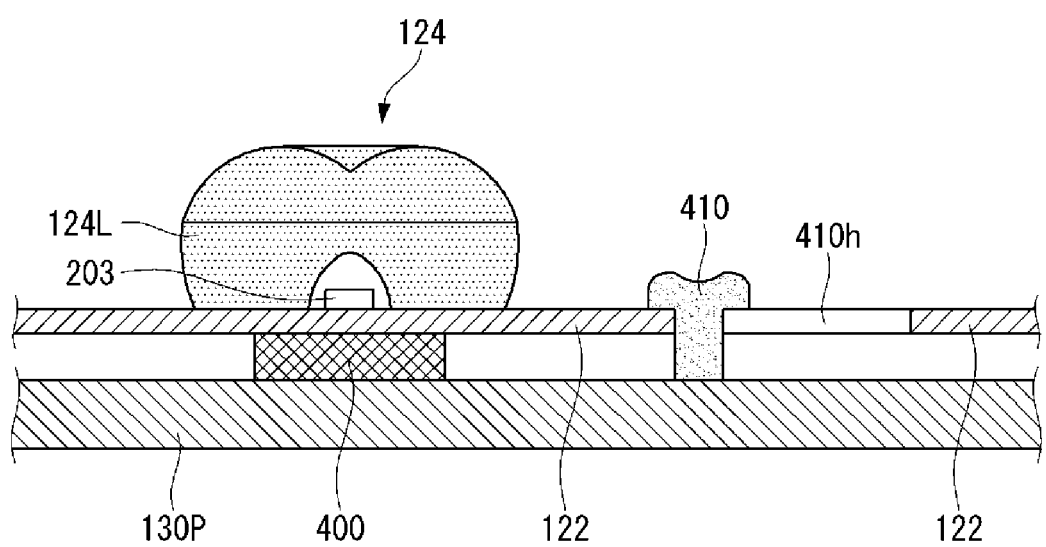

Referring to FIGS. 17 and 18, the coupling protuberance 410 may upwardly protrude from an upper surface of the flat portion 130P of the frame 130. The coupling protuberance 410 may be positioned on one side of the light assembly 124. The coupling protuberance 410 may be positioned on both sides of the light assembly 124. In another point of view, the coupling protuberance 410 may be positioned on one side of the heat dissipation protuberance 400. The coupling protuberance 410 may be positioned on both sides of the heat dissipation protuberance 400. The substrate 122 may contact the heat dissipation protuberance 400 using the coupling protuberance 410. The coupling protuberance 410 may prevent the substrate 122 from being detached from the heat dissipation protuberance 400. Hence, heat generated in the light assembly 124 or the light source 203 may be transferred to the flat portion 130P of the frame 130 through the substrate 122 and the heat dissipation protuberance 400.

Figure 19:
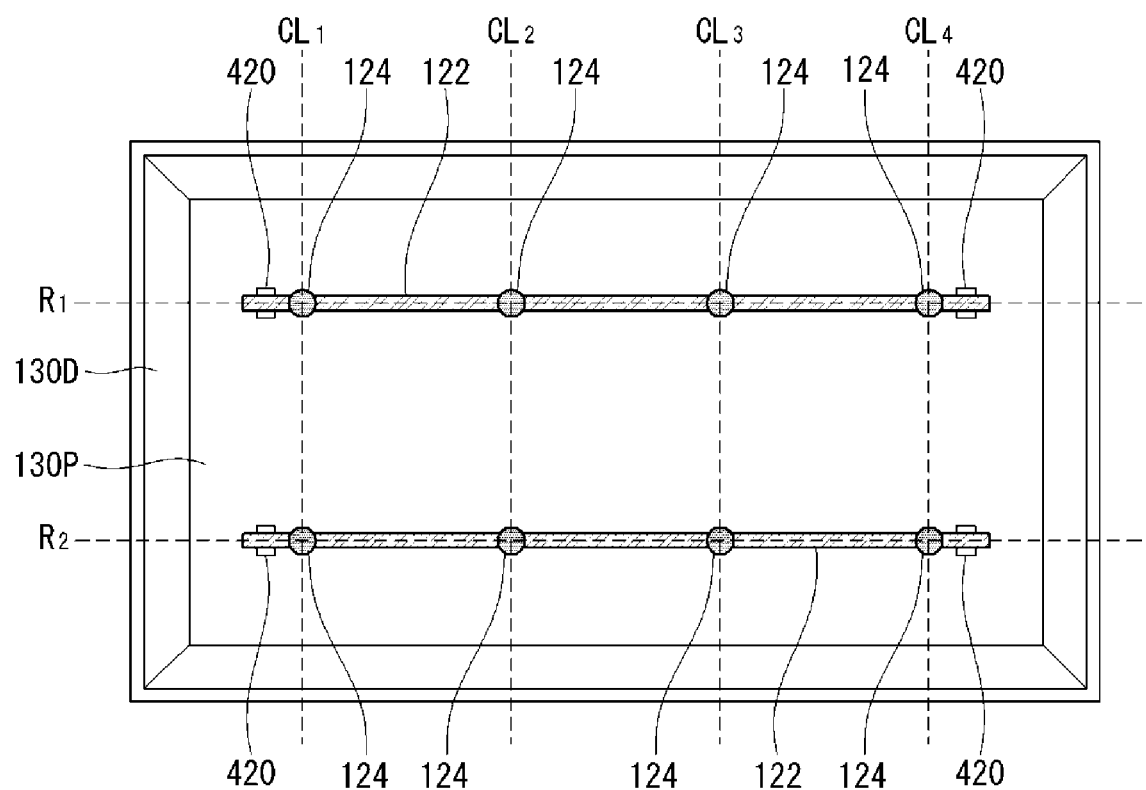

Referring to FIG. 19, an inclined protuberance (or an inclined protrusion) 420 may be formed on the frame 130. The inclined protuberance 420 may be formed on the flat portion 130P of the frame 130. The inclined protuberance 420 may be positioned at one end of the substrate 122. The inclined protuberance 420 may be positioned at both ends of the substrate 122. The inclined protuberance 420 may be positioned under both ends of the substrate 122. Namely, both ends of the substrate 122 may be placed on the inclined protuberance 420. For example, the inclined protuberance 420 on the first row R1 may be positioned adjacent to the first column CL1 and the fourth column CL4. Further, the inclined protuberance 420 on the second row R2 may be positioned adjacent to the first column CL1 and the fourth column CL4. The inclined protuberance 420 may be referred to as a second protuberance.

Figure 20:
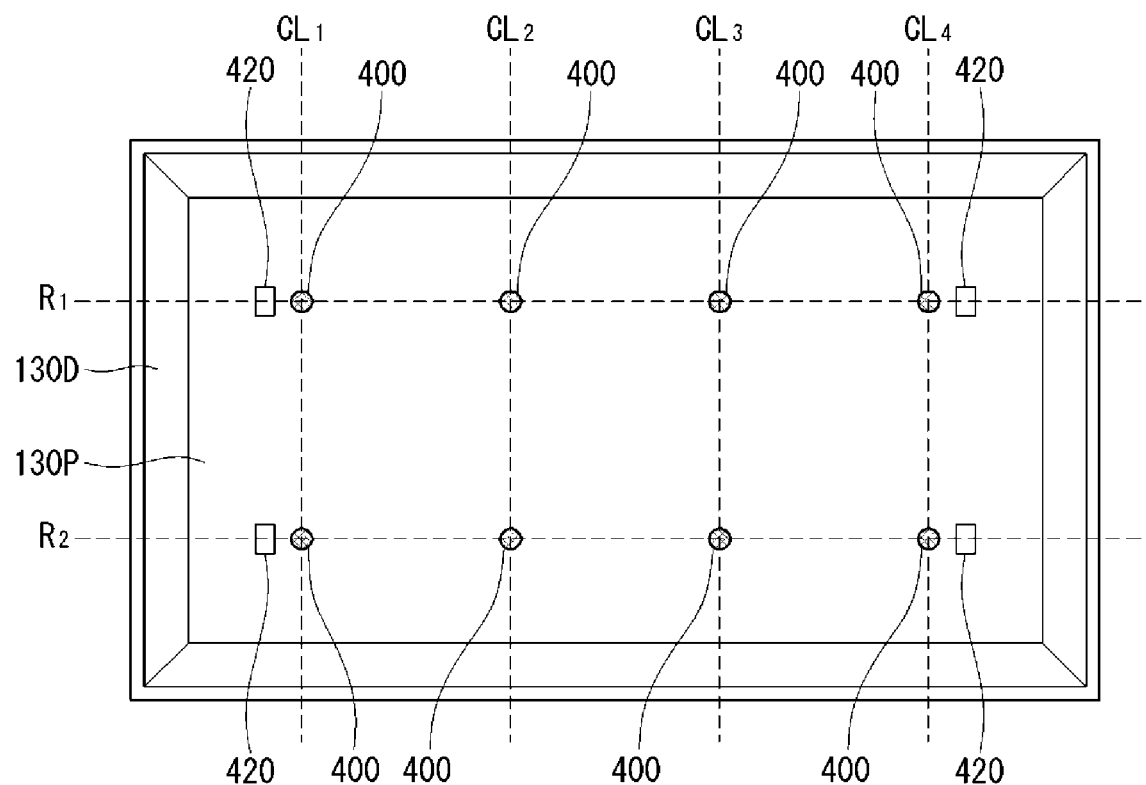

Referring to FIG. 20, the inclined protuberance 420 may be formed on the frame 130. The plurality of inclined protuberances 420 may be formed on the frame 130. The inclined protuberance 420 may be positioned adjacent to the heat dissipation protuberance 400. One of the plurality of inclined protuberances 420 may be positioned on one side of the heat dissipation protuberance 400, and the other inclined protuberance 420 may be positioned on the other side of the heat dissipation protuberance 400. Namely, the plurality of inclined protuberances 420 may be positioned on both sides of the heat dissipation protuberance 400. For example, when the plurality of heat dissipation protuberances 400 of the first row R1 are positioned on the first column CL1, the second column CL2, the third column CL3, and the fourth column CL4, one inclined protuberance 420 may be positioned adjacent to the heat dissipation protuberance 400 positioned on the first column CL1, and the other inclined protuberance 420 may be positioned adjacent to the heat dissipation protuberance 400 positioned on the fourth column CL4. Namely, the plurality of inclined protuberances 420 may be positioned adjacent to one end and the other end of the plurality of heat dissipation protuberances 400, which are sequentially arranged.

Figure 21:
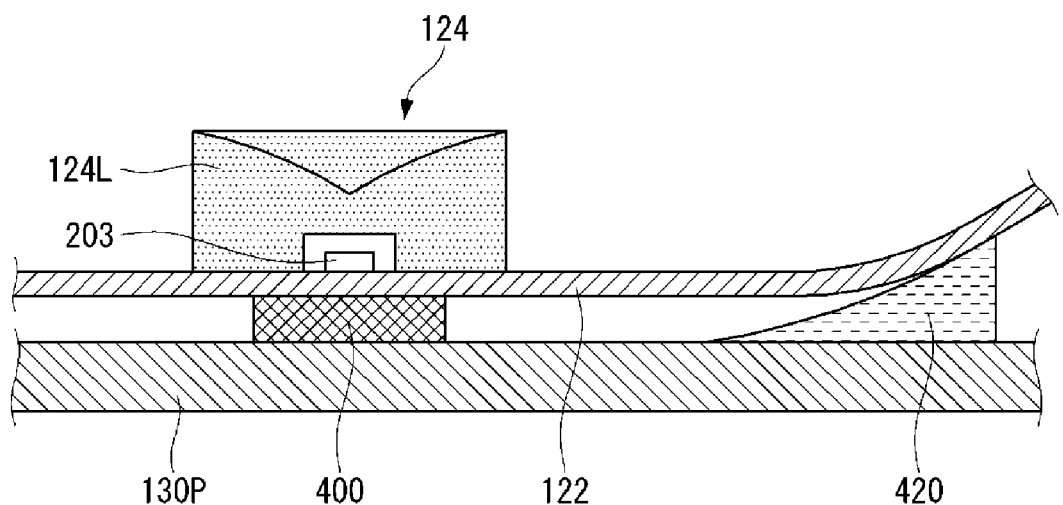
Figure 22:
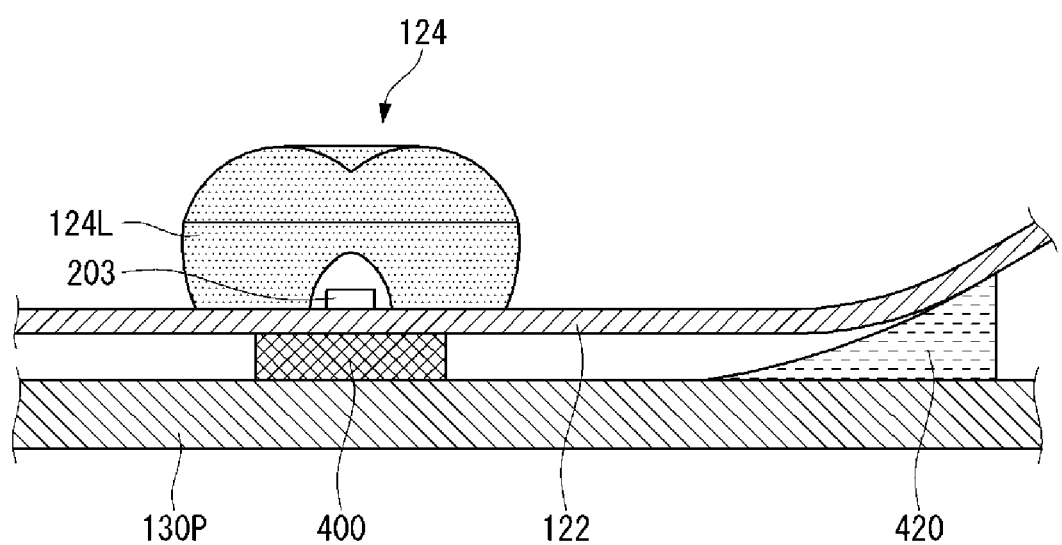

Referring to FIGS. 21 and 22, the inclined protuberance 420 may be positioned adjacent to the light assembly 124 or the light source 203. In another point of view, the inclined protuberance 420 may be positioned adjacent to the heat dissipation protuberance 400. The inclined protuberance 420 may have an inclined surface facing toward the light assembly 124 or the light source 203. In another point of view, the inclined protuberance 420 may have an inclined surface facing toward the heat dissipation protuberance 400. The inclined surface may provide an inclination for the substrate 122. Hence, the substrate 122 or the light assembly 124 may contact the heat dissipation protuberance 400. The inclined protuberance 420 may improve the contact between the substrate 122 and the heat dissipation protuberance 400, so that heat generated in the light assembly 124 is transferred to the frame 130.

Figure 23:
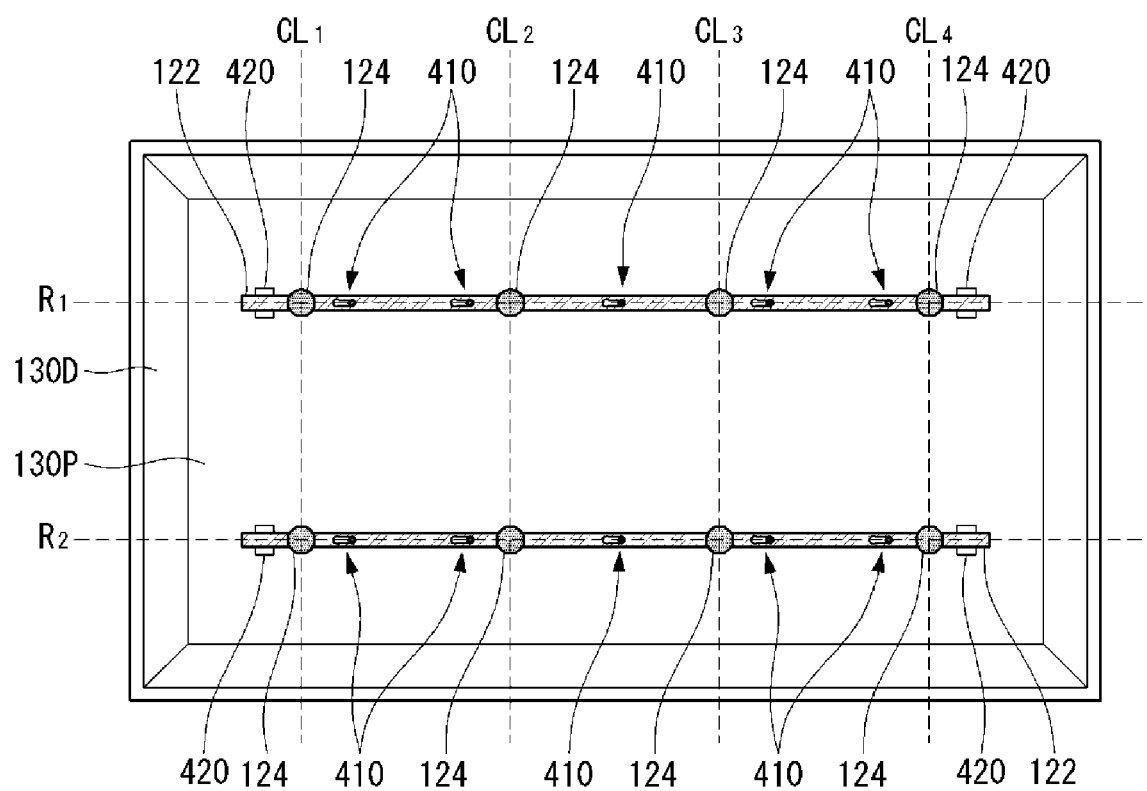

Referring to FIG. 23, the frame 130 may be flat. The frame 130 may have a flat portion 130P. The flat portion 130P may form a plane of the frame 130. The frame 130 may have an inclined portion 130D. The inclined portion 130D may form a perimeter of the frame 130. The inclined portion 130D may be positioned at an edge of the flat portion 130P. The inclined portion 130D may be positioned at one surface of the flat portion 130P. The inclined portion 130D may be positioned at all of four surfaces of the flat portion 130P. The frame 130 may entirely have a bowl shape formed by the flat portion 130P and the inclined portion 130D.

The substrate 122 may be installed on the frame 130. The substrate 122 may elongate in the left-right direction of the frame 130. The substrate 122 may be disposed on an upper part of the front surface of the frame 130. The substrate 122 may be disposed on a lower part of the front surface of the frame 130. The plurality of substrates 122 may be installed on the frame 130. The plurality of substrates 122 may be sequentially arranged from the upper part to the lower part of the front surface of the frame 130. Namely, the plurality of substrates 122 may elongate in the left-right direction of the frame 130 and may be arranged in the up-down direction of the frame 130.

The light assembly 124 may be mounted on the substrate 122. The plurality of light assemblies 124 may be mounted on the substrate 122. The plurality of light assemblies 124 may be sequentially arranged along the longitudinal direction of the substrate 122. Namely, the plurality of light assemblies 124 may be entirely evenly arranged on the flat portion 130P of the frame 103.

A coupling protuberance 410 may be formed on the frame 130. The coupling protuberance 410 may protrude from a front surface of the flat portion 130P of the frame 130. The coupling protuberance 410 may be a plurality of coupling protuberances. The plurality of coupling protuberances 410 may be formed along the substrate 122. Namely, the plurality of coupling protuberances 410 may be sequentially formed on the front surface of the flat portion 130P of the frame 130 along the longitudinal direction of the substrate 122. In another point of view, the plurality of coupling protuberances 410 may be disposed between the plurality of light assemblies 124.

An inclined protuberance 420 may be formed on the frame 130. The inclined protuberance 420 may be formed on the flat portion 130P of the frame 130. The inclined protuberance 420 may be positioned at one end of the substrate 122. The inclined protuberance 420 may be positioned at both ends of the substrate 122. The inclined protuberance 420 may be positioned under both ends of the substrate 122. Namely, both ends of the substrate 122 may be placed on the inclined protuberance 420. For example, the inclined protuberance 420 on the first row R1 may be positioned adjacent to the first column CL1 and the fourth column CL4. Further, the inclined protuberance 420 on the second row R2 may be positioned adjacent to the first column CL1 and the fourth column CL4.

Figure 24:
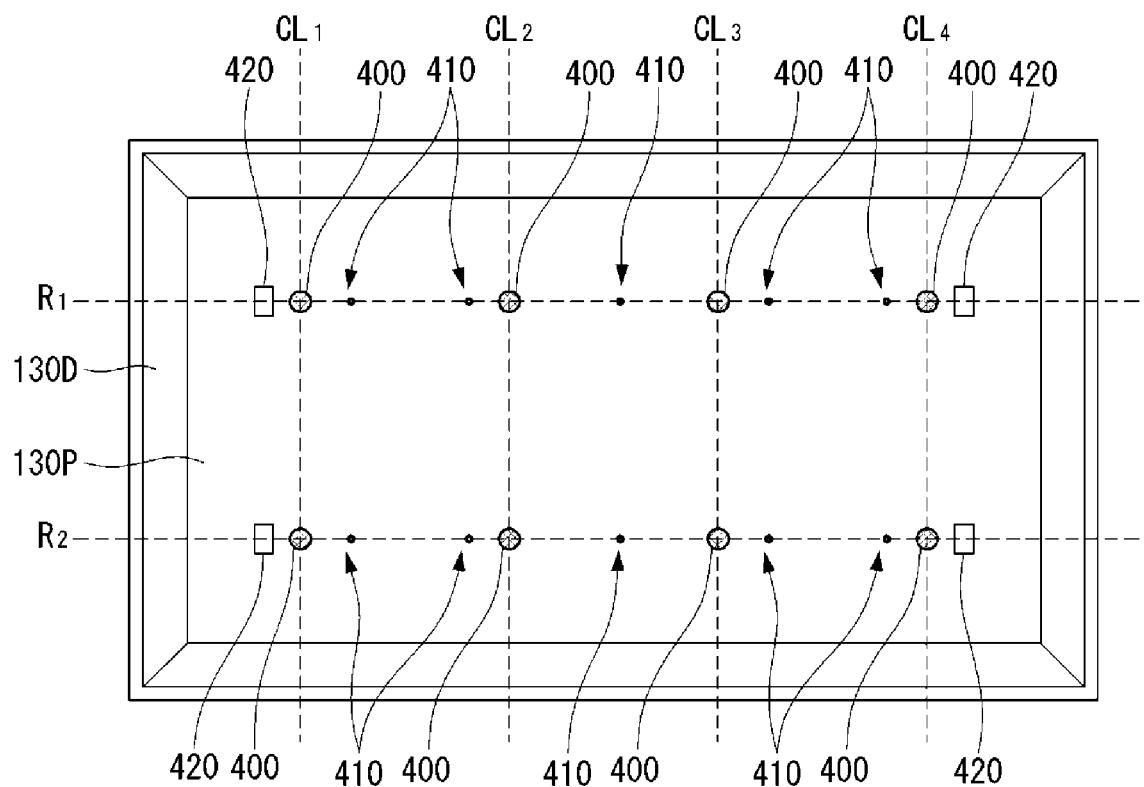

Referring to FIG. 24, a heat dissipation protuberance 400 may be positioned on the frame 130. The heat dissipation protuberance 400 may be positioned on the front surface of the flat portion 130P of the frame 103. The heat dissipation protuberance 400 may be a plurality of heat dissipation protuberances. The plurality of heat dissipation protuberances 400 may be disposed on the front surface of the flat portion 130P in the left-right direction or the up-down direction. In another point of view, the heat dissipation protuberances 400 may correspond to the arrangement of the light assemblies 124. Namely, the heat dissipation protuberance 400 may be positioned under the light assembly 124.

The plurality of coupling protuberances 410 may be disposed between the plurality of heat dissipation protuberances 400. For example, in a first row R1, the two coupling protuberances 410 between a first column CL1 and a second column CL2 may be formed on the frame 130; the one coupling protuberance 410 between the second column CL2 and a third column CL3 may be formed on the frame 130; and the two coupling protuberances 410 between the third column CL3 and a fourth column CL4 may be formed on the frame 130. Further, in a second row R2, the two coupling protuberances 410 between the first column CL1 and the second column CL2 may be formed on the frame 130; the one coupling protuberance 410 between the second column CL2 and the third column CL3 may be formed on the frame 130; and the two coupling protuberances 410 between the third column CL3 and the fourth column CL4 may be formed on the frame 130.

The inclined protuberance 420 may be formed on the frame 130. The plurality of inclined protuberances 420 may be formed on the frame 130. The inclined protuberance 420 may be positioned adjacent to the heat dissipation protuberance 400. One of the plurality of inclined protuberances 420 may be positioned on one side of any heat dissipation protuberance 400, and the other inclined protuberance 420 may be positioned on one side of other heat dissipation protuberance 400. Namely, the plurality of inclined protuberances 420 may be positioned on both sides of at least one heat dissipation protuberance 400.

For example, when the plurality of heat dissipation protuberances 400 of the first row R1 are positioned on the first column CL1, the second column CL2, the third column CL3, and the fourth column CL4, one inclined protuberance 420 may be positioned adjacent to the heat dissipation protuberance 400 positioned on the first column CL1, and the other inclined protuberance 420 may be positioned adjacent to the heat dissipation protuberance 400 positioned on the fourth column CL4. Namely, the plurality of inclined protuberances 420 may be positioned adjacent to one end and the other end of the plurality of heat dissipation protuberances 400, which are sequentially arranged.

As another example, at least two inclined protuberances 420 may be positioned on the left and right sides of the front surface of the flat portion 130P of the frame 130. The heat dissipation protuberance 400 may be positioned between at least two inclined protuberances 420. The plurality of heat dissipation protuberances 400 may be sequentially arranged between at least two inclined protuberances 420 along the longitudinal direction of the substrate 122 or the left-right direction of the frame 130.

Namely, at least two inclined protuberances 420 may be positioned on both sides of the heat dissipation protuberance 400 or both sides of the plurality of heat dissipation protuberances 400 and may provide an inclination for both ends of the substrate 122. Hence, the substrate 122 may efficiently contact the heat dissipation protuberance 400.

Figure 25:
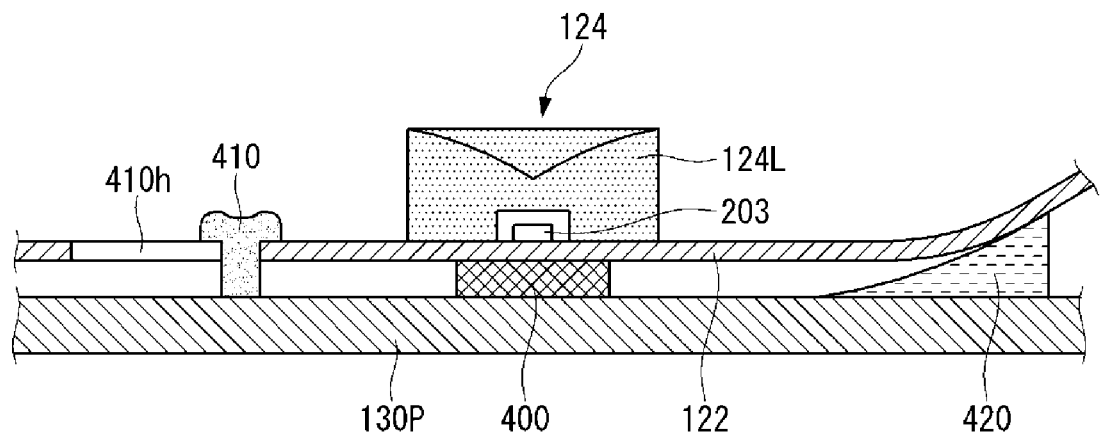
Figure 26:
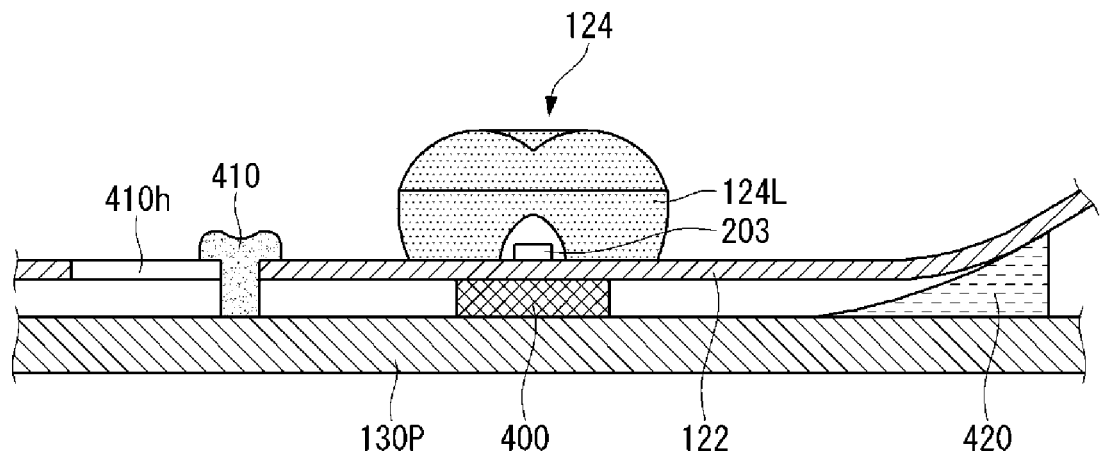

Referring to FIGS. 25 and 26, the heat dissipation protuberance 400 may be formed on the front surface of the frame 130. The inclined protuberance 420 may be formed on the front surface of the frame 130. In this instance, the inclined protuberance 420 may be positioned adjacent to the heat dissipation protuberance 400 while being separated from the heat dissipation protuberance 400. A height of the inclined protuberance 420 may be greater than a height of the heat dissipation protuberance 400. The substrate 122 may be placed on the heat dissipation protuberance 400. In this instance, the substrate 122 may be simultaneously placed on the inclined protuberance 420 as well as the heat dissipation protuberance 400. An inclined surface of the inclined protuberance 420 may face toward the heat dissipation protuberance 400. Namely, the inclined protuberance 420 may provide an inclination for the substrate 122. Hence, the substrate 122 may efficiently contact the heat dissipation protuberance 400.

A coupling protuberance 410 may be formed on the front surface of the frame 130. The inclined protuberance 420 may be positioned adjacent to the heat dissipation protuberance 400 while being separated from the heat dissipation protuberance 400. The coupling protuberance 410 may be inserted into a coupling groove 410h of the substrate 122 and may prevent the substrate 122 from excessively being separated from the frame 130. Namely, the coupling protuberance 410 may maintain a contact state between the substrate 122 and the heat dissipation protuberance 400.

The light source 203 or the light assembly 124 may be positioned on the heat dissipation protuberance 400. The light source 203 or the light assembly 124 may be mounted on the substrate 122 on the heat dissipation protuberance 400. The heat generated in the light source 203 or the light assembly 124 may be efficiently transferred to the heat dissipation protuberance 400 and the frame 130.

Figure 27:
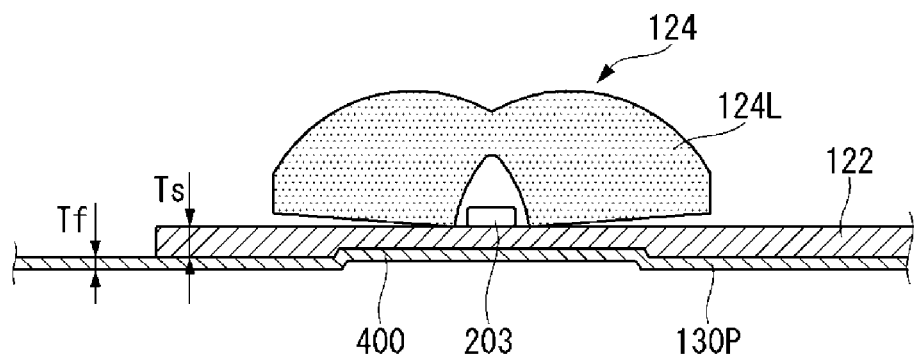

Referring to FIG. 27, the substrate 122 may entirely contact the flat portion 130P of the frame 130. The heat dissipation protuberance 400 may be formed by pressing the frame 130. The heat dissipation protuberance 400 may be formed by pressing the flat portion 130P. Namely, as the heat dissipation protuberance 400 protrudes from the front surface of the flat portion 130P, a back surface of the flat portion 130P may be depressed. Hence, a contact state between a lower surface of the substrate 122, on which the light assembly 124 is positioned, and the flat portion 130P of the frame 130 may be maintained. In other words, the heat generated in the light source 203 or the light assembly 124 may be transferred to the heat dissipation protuberance 400 through the substrate 122 and may be dissipated through the flat portion 130P of the frame 130.

A thickness Tf of the flat portion 130P may be less than a thickness Ts of the substrate 122. Because the thickness Tf of the flat portion 130P is less than the thickness Ts of the substrate 122, the heat transfer or the heat dissipation may be efficiently performed.

Figure 28:
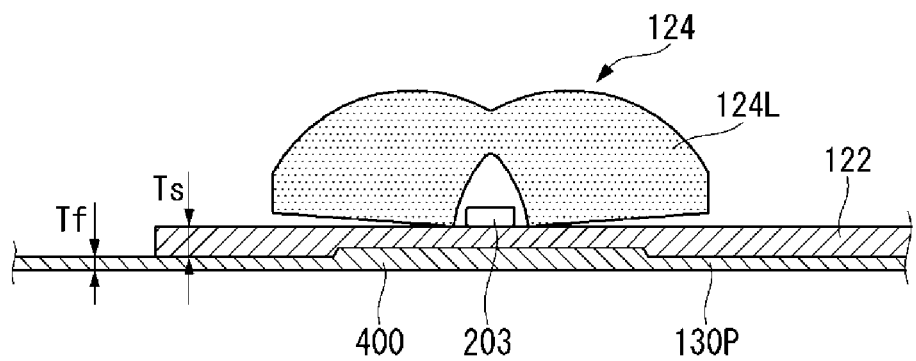

Referring to FIG. 28, the heat dissipation protuberance 400 may protrude from the front surface of the flat portion 130P. In this instance, the back surface of the flat portion 130P, on which the heat dissipation protuberance 400 is positioned, may be flat. Namely, the heat dissipation protuberance 400 may protrude from the front surface of the flat portion 130P of the frame 130 to the outside. In this instance, the protrusion of the heat dissipation protuberance 400 may not lead to a deformation of the back surface of the flat portion 130P of the frame 130.

Hence, a heat absorption performance of a portion of the frame 130, on which the heat dissipation protuberance 400 is formed, may be improved. The thickness Tf of the flat portion 130P may be less than the thickness Ts of the substrate 122. Because the thickness Tf of the flat portion 130P is less than the thickness Ts of the substrate 122, the transfer or the dissipation of heat absorbed in the heat dissipation protuberance 400 may be efficiently performed.

Figure 29:
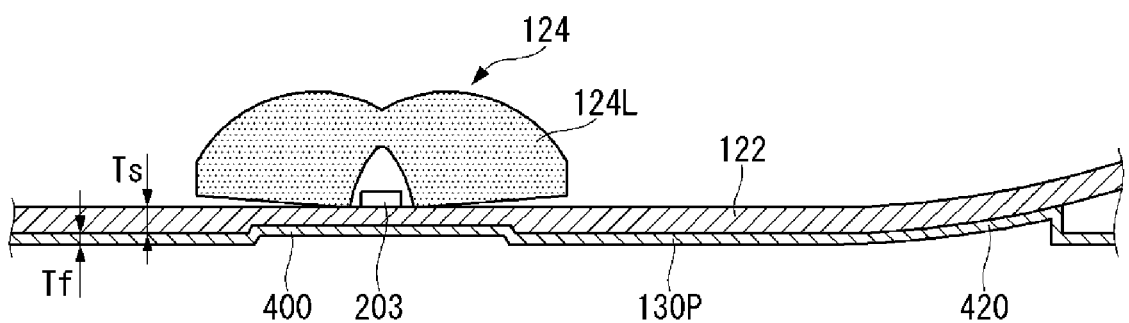

Referring to FIG. 29, the inclined protuberance 420 may be positioned under the substrate 122. The inclined protuberance 420 may provide an inclination for one end of the substrate 122. The inclined protuberance 420 may be separated from the heat dissipation protuberance 400. A height of the inclined protuberance 420 may be greater than a height of the heat dissipation protuberance 400. Hence, the substrate 122 may entirely contact the flat portion 130P of the frame 130. The substrate 122 may contact the heat dissipation protuberance 400 even if the frame 130 bends due to the inclined protuberance 420.

The inclined protuberance 420 may be formed by pressing the frame 130. The inclined protuberance 420 may be formed as the front surface of the flat portion 130P of the frame 130 protrudes. In this instance, the back surface of the flat portion 130P of the frame 130 may be depressed.

Figure 30:
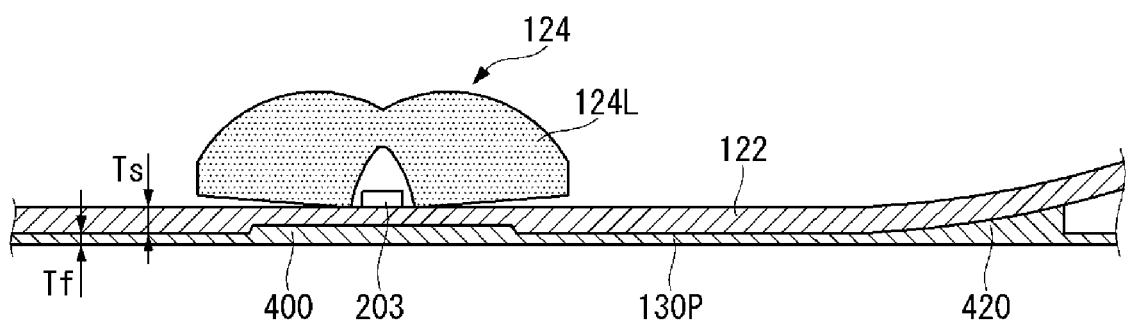

Referring to FIG. 30, the inclined protuberance 420 may protrude from the front surface of the flat portion 130P. In this instance, the back surface of the flat portion 130P, on which the inclined protuberance 420 is positioned, may be flat. Namely, the inclined protuberance 420 may protrude from the front surface of the flat portion 130P of the frame 130 to the outside. In this instance, the protrusion of the inclined protuberance 420 may not lead to a deformation of the back surface of the flat portion 130P of the frame 130.

Figure 31:
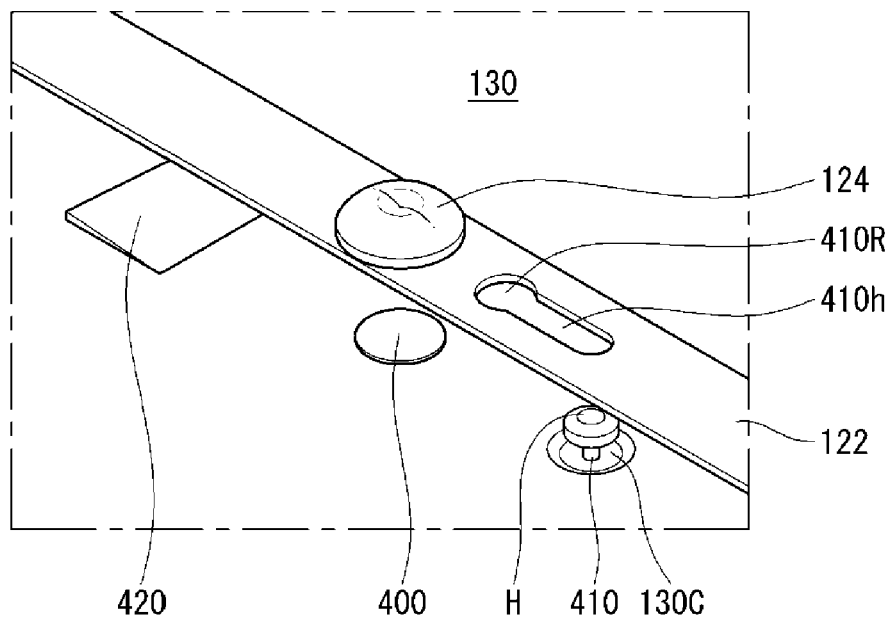
Figure 32:
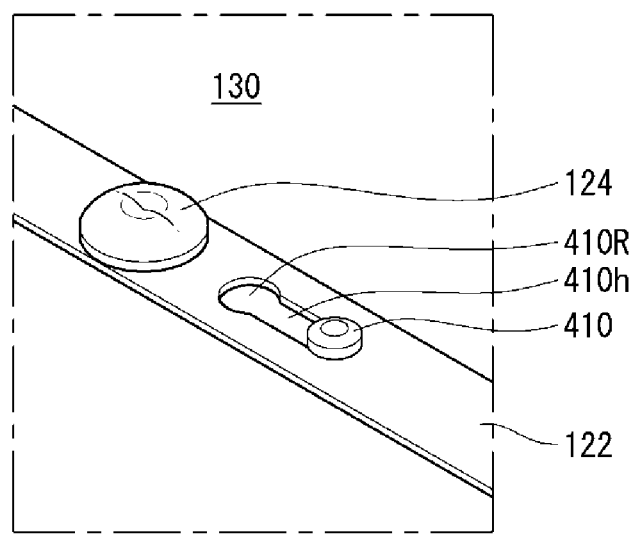

Referring to FIGS. 31 and 32, the inclined protuberance 420 may be positioned at one side of the heat dissipation protuberance 400. The inclined protuberance 420 may provide an inclination for the substrate 122 and may cause the lower surface of the substrate 122, on which the light assembly 124 is positioned, to contact the heat dissipation protuberance 400. The coupling protuberance 410 may be positioned on the other side of the heat dissipation protuberance 400. A depression 130C may be formed on the flat portion 130P of the frame 130. The coupling protuberance 410 may be positioned on the depression 130C of the flat portion 130P. Namely, an entire height of the coupling protuberance 410 may be covered by the depression 130C, and the substrate 122 may be positioned closer to the frame 130. In other words, the coupling protuberance 410 positioned on the depression 130C may efficiently bring the lower surface of the substrate 122 into contact with the flat portion 130P of the frame 130 and/or the heat dissipation protuberance 400.

Figure 33:
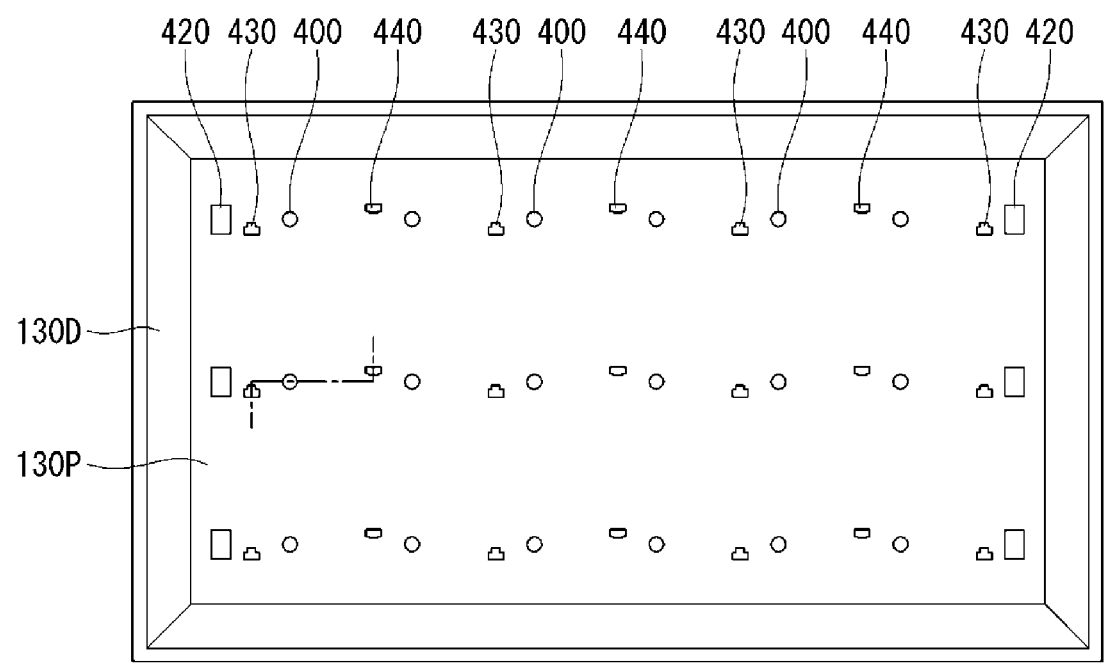
Figure 34:
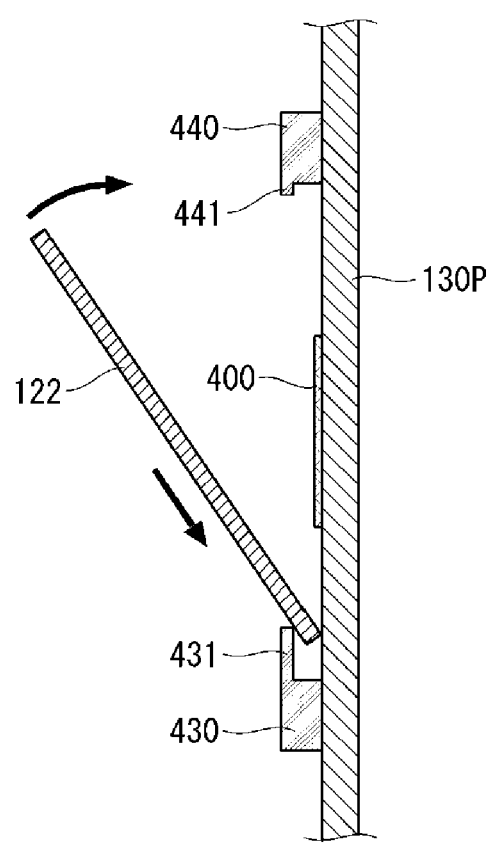
Figure 35:
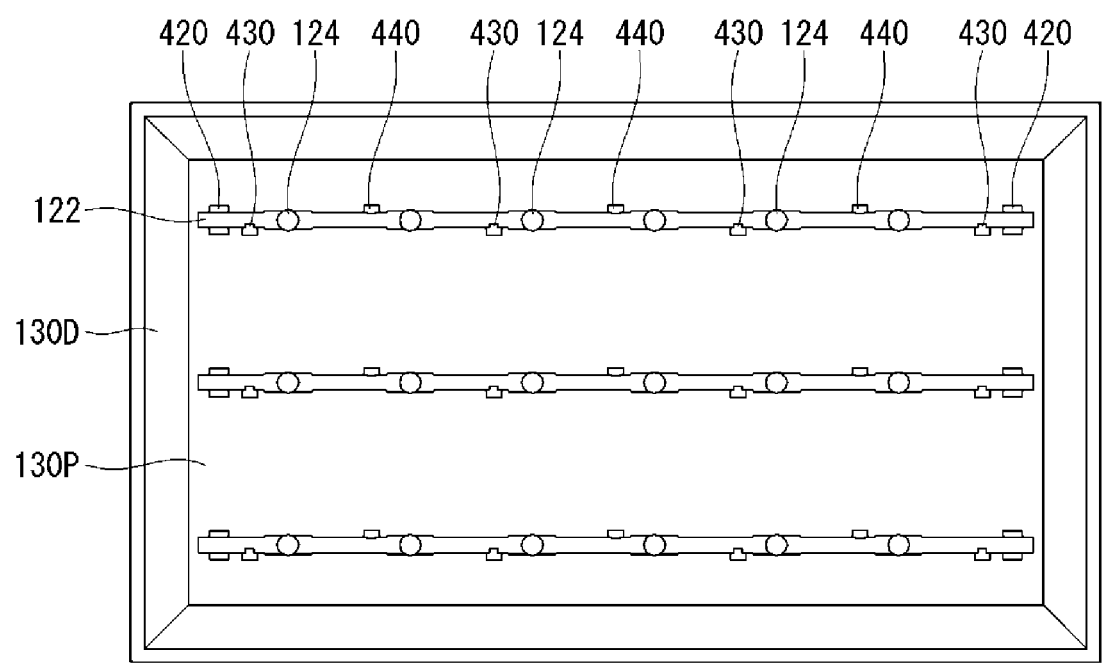
Figure 36:
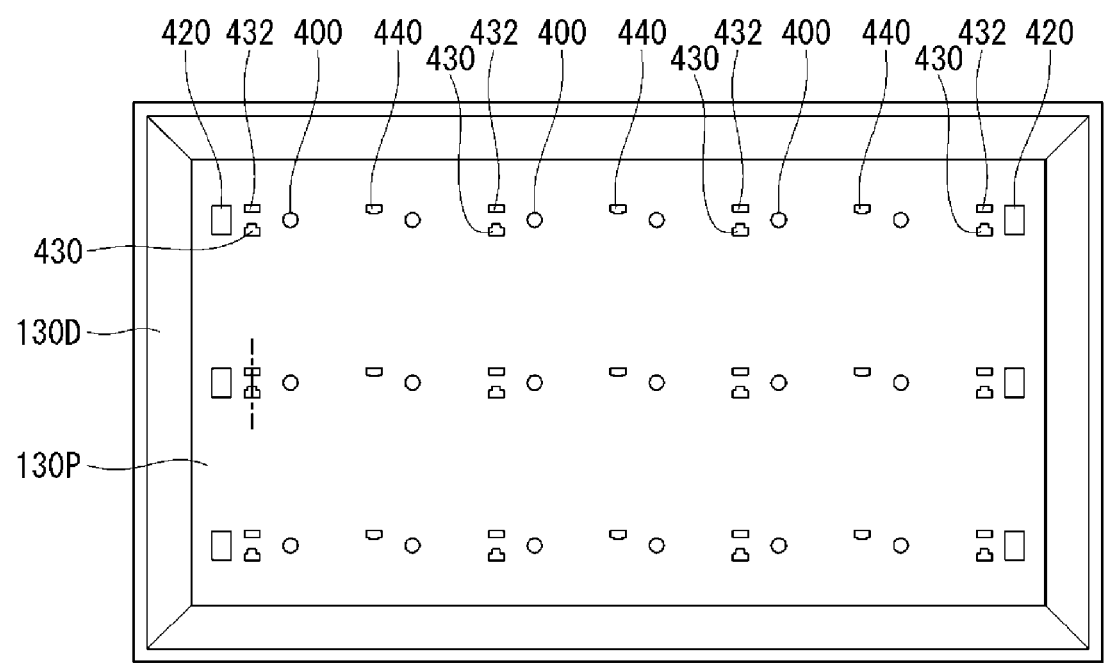
Figure 37:
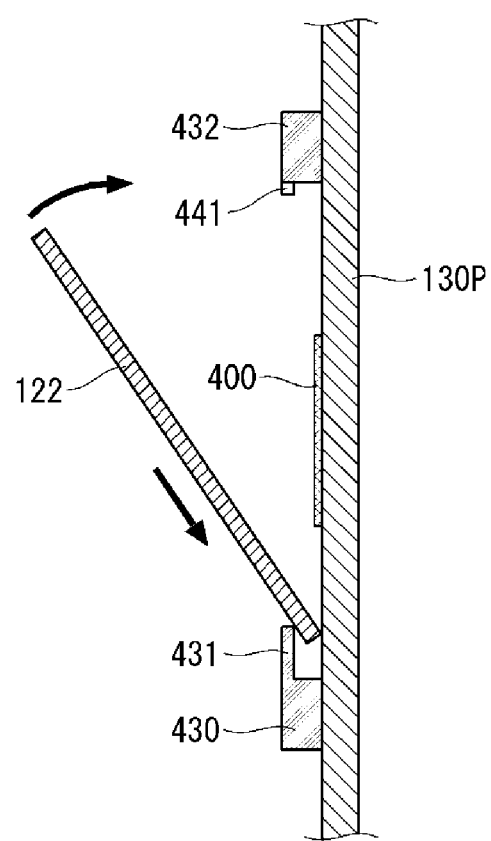
Figure 38:
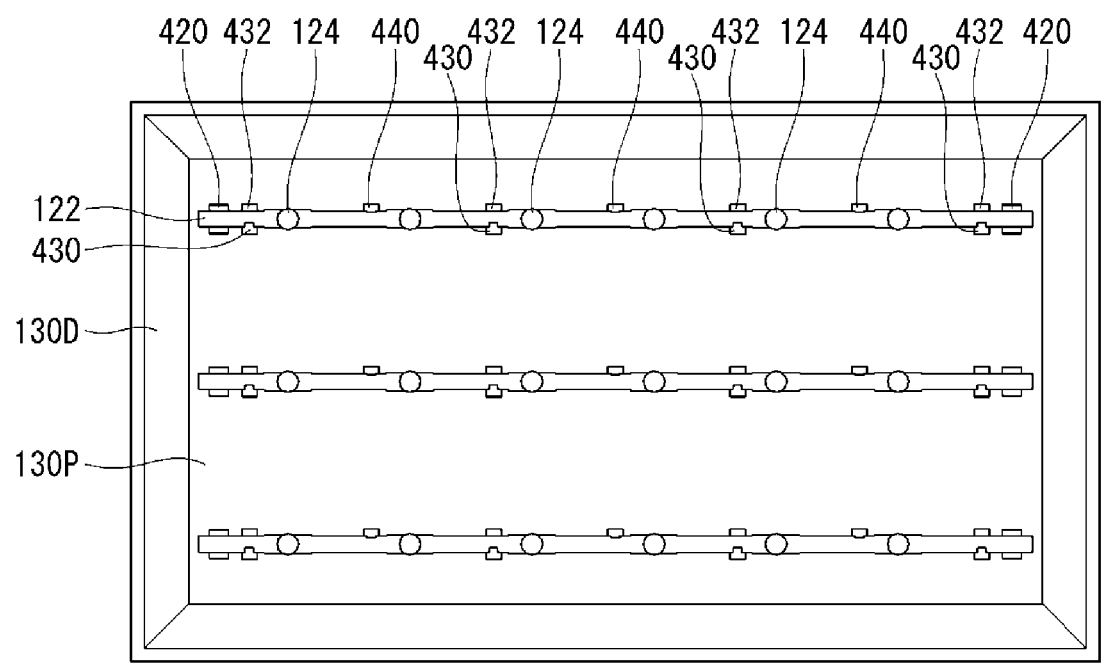
Figure 39:
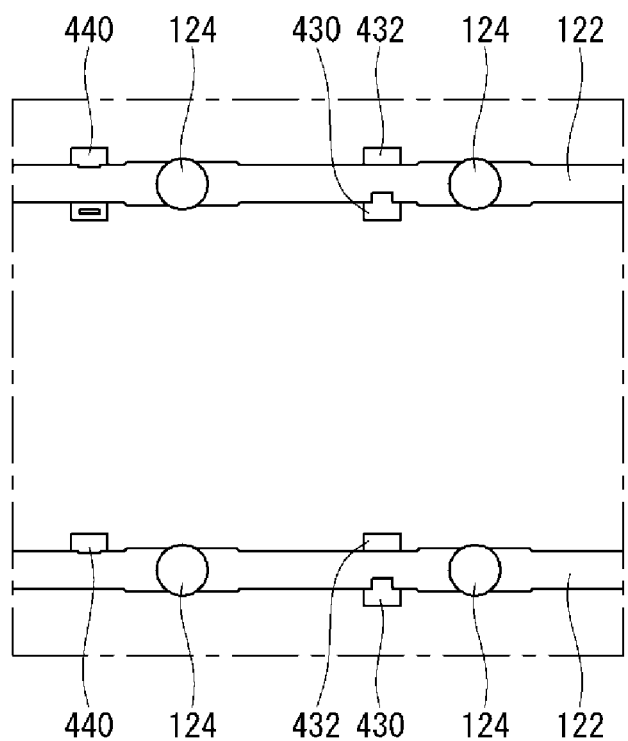

Referring to FIGS. 33 to 35, a first holder 430 may be positioned on the frame 130. The first holder 430 may be positioned on the flat portion 130P. The first holder 430 may be formed on the flat portion 130P. The first holder 430 may have a protrusion 431. The first holder 430 may be fixed to the flat portion 130P. The protrusion 431 may protrude from the first holder 430 to the outside. One side of the substrate 122 may be safely placed on the first holder 430. The one side of the substrate 122 may be inserted into the first holder 430. The one side of the substrate 122 may be supported by the first holder 430 and the protrusion 431.

A second holder 440 may be positioned on the frame 130. The second holder 440 may be positioned on the flat portion 130P. The second holder 440 may be formed on the flat portion 130P. The second holder 440 may have a protrusion 441. The protrusion 441 of the second holder 440 may face toward the protrusion 431 of the first holder 430. Namely, when the protrusion 431 of the first holder 430 faces toward the upper side of the frame 130, the protrusion 441 of the second holder 440 may face toward the lower side of the frame 130. Further, when the protrusion 431 of the first holder 430 faces toward the lower side of the frame 130, the protrusion 441 of the second holder 440 may face toward the upper side of the frame 130. Hence, the substrate 122 may be fixed to the frame 130 by the first holder 430 and the second holder 440.

In this instance, the first holders 430 and the second holders 440 may be alternately positioned. The heat dissipation protuberance 400 may be positioned between the first holder 430 and the second holder 440. When the first holder 430 is positioned on the upper side of the substrate 122 and the second holder 440 is positioned on the lower side of the substrate 122 based on the up-down direction of the frame 130, the heat dissipation protuberance 400 may be positioned between the first holder 430 and the second holder 440. In another point of view, the first holders 430, the second holders 440, and/or the heat dissipation protuberances 400 may be alternately positioned based on the left-right direction of the frame 130.

Hence, the substrate 122 may be fixed to the frame 130, and also may contact the heat dissipation protuberance 400 irrespective of the flatness of the frame 130. Namely, heat generated in the light assembly 124 may be efficiently dissipated through the frame 130.

Referring to FIGS. 36 to 39, a supporter 432 may face the first holder 430. The supporter 432 may be positioned on the upper side of the first holder 430 based on the up-down direction of the frame 130. The supporter 432 may be positioned on the left side or the right side of the second holder 440 based on the left-right direction of the frame 130. The supporter 432 may be positioned on both sides of the second holder 440. Hence, when the substrate 122 is inserted into the first holder 430, the supporter 432 may support the substrate 122. Further, after the substrate 122 is inserted into the first holder 430, the supporter 432 may prevent the substrate 122 from being detached from the first holder 430.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame at a rear of the display panel, the frame including first and second protrusions, and the frame comprising a first side, a second side connected with the first side, and a third side connected with the first side opposite the second side;
   a first substrate at a front surface of the frame, the first substrate elongated in a direction along the first side of the frame; and
   a plurality of first light sources disposed on the first substrate in the direction, the plurality of the first light sources including a foremost light source closest to the second side of the frame and a rearmost light source closest to the third side of the frame,
   wherein the first protrusion is positioned adjacent to an end of the first substrate adjacent to the foremost light source in the first substrate and positioned under the first substrate, and the second protrusion is positioned adjacent to an end of the first substrate adjacent to the rearmost light source in the first substrate and positioned under the first substrate,
   wherein the frame is pressed to form the first and the second protrusion such that the protrusions are formed on the front surface of the frame,
   wherein the first and the second protrusions are inclined so that the first protrusion includes a first height of the first protrusion and a second height of the first protrusion farther from the second side of the frame than the first height of the first protrusion, and the second protrusion includes a first height of the second protrusion and a second height of the second protrusion farther from the third side of the frame than the first height of the second protrusion, and
   wherein the first height of the first protrusion is greater than the second height of the first protrusion, and the first height of the second protrusion is greater than the second height of the second protrusion.

2. The display device of claim 1, further comprising a second substrate at the front surface of the frame, the second substrate elongated in the direction along the first side of the frame;
   a plurality of second light sources disposed on the second substrate in the direction, the plurality of the second light sources including a foremost light source closest to the second side of the frame and a rearmost light source closest to the third side of the frame; and
   third and fourth protrusions between the second substrate and the frame, the third protrusion positioned adjacent to an end of the second substrate adjacent to the foremost light source in the second substrate and positioned under the second substrate, and the fourth protrusion positioned adjacent to an end of the second substrate adjacent to the rearmost light source in the second substrate and positioned under the second substrate, at least one of the third and the fourth protrusions includes an inclined surface.

3. The display device of claim 2, wherein the first and second protrusions protrude from the front surface of the frame.

4. The display device of claim 2,
   wherein the third and the fourth protrusions are inclined so that the third protrusion includes a first height of the third protrusion and a second height of the third protrusion farther from the second side of the frame than the first height of the third protrusion, and the fourth protrusion includes a first height of the fourth protrusion and a second height of the fourth protrusion farther from the third side of the frame than the first height of the fourth protrusion, and
   wherein the first height of the third protrusion is greater than the second height of the third protrusion, and the first height of the fourth protrusion is greater than the second height of the fourth protrusion.

5. The display device of claim 2, wherein each of the protrusions is in contact with each of the substrates.

6. The display device of claim 2, further comprising:
   a plurality of lenses corresponding to the first and second light sources.

7. The display device of claim 6, wherein a width of the substrate on which each lens is disposed is greater than a width of the substrate between each lens.

8. The display device of claim 6, wherein a corresponding lens has a cylindrical shape and includes:
   a side surface;
   an upper surface downwardly depressed from an upper end of the side surface; and
   a lower surface opposite the upper surface, the lower surface upwardly depressed to contain a corresponding light source.

9. The display device of claim 2, wherein a width of each of the protrusions is greater than a width of each of the substrates.

10. The display device of claim 2, wherein the frame and each of the protrusions includes a metal material.

11. The display device of claim 2, wherein the first and second light sources are sequentially positioned along a left and right direction or an up and down direction of the display panel.

12. The display device of claim 2, further comprising:
   an optical sheet between the display panel and the first and second light sources; and
   a reflective sheet on the first and second substrates,
   wherein the reflective sheet includes a plurality of holes corresponding to the first and second light sources.

13. The display device of claim 2, wherein each of the protrusions is symmetrically inclined.

14. The display device of claim 1, wherein the first substrate includes a reflective surface facing the display panel.

15. The display device of claim 1, wherein the first substrate includes:
   a slit along the elongated direction of the first substrate; and
   a hole at an end of the slit, the hole being greater than a width of the slit.

16. The display device of claim 15, further comprising:
   a coupling protrusion protruding from the frame and passing through the slit or the hole.

17. The display device of claim 16, wherein the coupling protrusion has a head greater than the width of the slit and smaller than the hole.

18. The display device of claim 1, wherein at least a part of the first substrate is in contact with the frame.

* * * * *